United States Patent
Yao et al.

(10) Patent No.: US 11,570,837 B2
(45) Date of Patent: Jan. 31, 2023

(54) COMMUNICATION METHOD AND COMMUNICATIONS DEVICE

(71) Applicant: Huawei Technologies Co., Ltd., Shenzhen (CN)

(72) Inventors: Chuting Yao, Beijing (CN); Yiru Kuang, Beijing (CN); Haibo Xu, Beijing (CN); Bin Xu, Beijing (CN); Zhenzhen Cao, Beijing (CN); Jian Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 37 days.

(21) Appl. No.: 17/053,703

(22) PCT Filed: May 5, 2019

(86) PCT No.: PCT/CN2019/085523
§ 371 (c)(1),
(2) Date: Nov. 6, 2020

(87) PCT Pub. No.: WO2019/214545
PCT Pub. Date: Nov. 14, 2019

(65) Prior Publication Data
US 2021/0219372 A1    Jul. 15, 2021

(30) Foreign Application Priority Data

May 9, 2018 (CN) .......................... 201810439401.5

(51) Int. Cl.
*H04W 76/20* (2018.01)
*H04L 1/18* (2006.01)

(52) U.S. Cl.
CPC ............. *H04W 76/20* (2018.02); *H04L 1/189* (2013.01)

(58) Field of Classification Search
CPC ..... H04W 76/11; H04W 76/14; H04W 76/15; H04W 76/27; H04W 76/10; H04W 76/20;
(Continued)

(56) References Cited

U.S. PATENT DOCUMENTS

2015/0118993 A1* 4/2015 Rune .................... H04W 76/27
                                                                            455/410
2016/0044507 A1    2/2016 Agiwal et al.
(Continued)

FOREIGN PATENT DOCUMENTS

CN    105659690 A    6/2016
CN    105991243 A    10/2016
(Continued)

OTHER PUBLICATIONS

Qualcomm Incorporated, "PDCP duplication", 3GPP TSG RAN WG2 Meeting #NR adhod 2018, R2-1801244, (revision of R2-1713584), Jan. 22-26, 2018, 5 pages, Vancouver, Canada.
Catt, "Duplication activation/deactivation MAC CE", 3GPP TSG-RAN WG2#101, R2-1802149, Feb. 26-Mar. 2, 2018, 5 pages, Athens, Greece.
(Continued)

*Primary Examiner* — Jamal Javaid
(74) *Attorney, Agent, or Firm* — Slater Matsil, LLP

(57) ABSTRACT

This application provides a communication method and a communications device. The method includes: A first device receives a first message sent by a second device. The first message is used to indicate a bearer configuration of a bearer of the first device and an initial status of the bearer configuration, and the bearer configuration includes a first bearer configuration and/or a second bearer configuration. The first device determines the bearer configuration and the initial status of the bearer configuration based on the first message. According to the technical solutions in embodiments of this application, a bearer configuration of a terminal device and an initial status of the bearer configuration of the terminal can be indicated.

19 Claims, 11 Drawing Sheets

(58) Field of Classification Search
CPC .... H04W 92/18; H04W 28/0268; H04L 1/189
See application file for complete search history.

(56) References Cited

U.S. PATENT DOCUMENTS

| | | | |
|---|---|---|---|
| 2016/0119102 | A1 | 4/2016 | Agiwal et al. |
| 2016/0192249 | A1* | 6/2016 | Wu .................. H04W 36/0072 370/331 |
| 2018/0227961 | A1* | 8/2018 | Mallick ............ H04W 56/0015 |

FOREIGN PATENT DOCUMENTS

| | | | |
|---|---|---|---|
| CN | 107342851 | A | 11/2017 |
| JP | 2020524936 | A | 8/2020 |
| KR | 20170074924 | A | 6/2017 |
| WO | 2008007805 | A2 | 1/2008 |

OTHER PUBLICATIONS

3GPP TS 38.300 V0.5.0 (Jun. 2017), 3rd Generation Partnership Project; Technical Specification Group Radio Access Network; NR; NR and NG-RAN Overall Description; Stage 2 (Release 15), 55 pages.
3GPP TS 38.300 V15.1.0 (Mar. 2018), 3rd Generation Partnership Project; Technical Specification Group Radio Access Network; NR; NR and NG-RAN Overall Description; Stage 2 (Release 15), 71 pages.
3GPP TR 38.912 V1.0.0 (Mar. 2017), 3rd Generation Partnership Project; Technical Specification Group Radio Access Network; Study on New Radio (NR) Access Technology (Release 14), 74 pages.
3GPP TS 38.331 V15.1.0 (Mar. 2018), 3rd Generation Partnership Project; Technical Specification Group Radio Access Network; NR; Radio Resource Control (RRC); Protocol specification (Release 15), 268 pages.

* cited by examiner

COMMUNICATION METHOD AND COMMUNICATIONS DEVICE

CROSS-REFERENCE TO RELATED APPLICATIONS

This application is a national stage of International Application No. PCT/CN2019/085523, filed on May 5, 2019, which claims priority to Chinese Patent Application No. 201810439401.5, filed with the Chinese Patent Office on May 9, 2018 and entitled "COMMUNICATION METHOD AND COMMUNICATIONS APPARATUS", which is incorporated herein by reference in its entirety.

TECHNICAL FIELD

This application relates to the communications field, and more specifically, to a communication method and a communications device.

BACKGROUND

A bearer with duplication (duplication) is a new feature introduced into fifth-generation mobile communications (the 5th Generation, 5G) new radio (New Radio, NR). Two data units are generated at a packet data convergence protocol (Packet Data Convergence Protocol, PDCP) layer and transmitted to two connected radio link control (Radio Link Control, RLC) layers. A base station needs to indicate whether duplication is configured for a terminal device, and when configuring the bearer with duplication for the terminal device, the base station needs to specify an initial status of the bearer configured with duplication. The initial status may be understood as a status about whether configured duplication works after the terminal device receives configuration information. Currently, how to indicate an initial status of a bearer configured with duplication has not been specified in the 5G new radio.

Therefore, how to indicate a bearer configuration of a terminal device and an initial status of the bearer configuration in the 5G new radio becomes a technical problem to be urgently resolved.

SUMMARY

This application provides a communication method and a communications device, so that a bearer configuration of a terminal device and an initial status of the bearer configuration of the terminal can be indicated. Because both the bearer configuration of a bearer of the terminal and the initial status of the bearer configuration of the terminal are configured, communication efficiency is improved.

According to a first aspect, a communication method is provided. The communication method includes: A first device receives a first message sent by a second device. The first message is used to indicate a bearer configuration of a bearer of the first device and an initial status of the bearer configuration, and the bearer configuration includes a first bearer configuration and/or a second bearer configuration.

The first device determines the bearer configuration and the initial status of the bearer configuration based on the first message.

In the technical solution in this embodiment of this application, the first device receives the first message sent by the second device, and determines both the bearer configuration of the bearer of the first device and the initial status of the bearer configuration of the first device based on the first message. This improves communication efficiency.

With reference to the first aspect, in a first possible implementation of the first aspect, when the first message includes first indication information, it indicates that the bearer configuration is the first bearer configuration. Alternatively, when the first message does not include first indication information, it indicates that the bearer configuration is the second bearer configuration.

With reference to the first possible implementation of the first aspect, in a second possible implementation, when the first message includes the first indication information, a value of the first indication information is used to indicate an initial status of the first bearer configuration.

With reference to the second possible implementation of the first aspect, in a third possible implementation, when the bearer of the first device includes two paths, the value of the first indication information is used to indicate the initial status of the first bearer configuration, and the initial status includes an activated state or a deactivated state.

With reference to the second possible implementation of the first aspect, in a fourth possible implementation, when the bearer of the first device includes N paths, the initial status of the first bearer configuration includes initial statuses of N−1 paths in the N paths other than a primary path, the initial statuses of the N−1 paths each are an activated state or a deactivated state, and the value of the first indication information is one bit or ranges from 0 to 1, and is used to indicate the initial statuses of the N−1 paths, where N is a positive integer greater than 1.

With reference to the second possible implementation of the first aspect, in a fifth possible implementation, when the bearer of the first device includes N paths, the initial status of the first bearer configuration includes initial statuses of N−1 paths in the N paths other than a primary path. The initial statuses of the N−1 paths include an activated state or a deactivated state, and the value of the first indication information is N−1 bits or ranges from 0 to $2^{(N-1)}-1$ and is used to indicate the initial statuses of the N−1 paths, where N is a positive integer greater than 1.

With reference to the second possible implementation of the first aspect, in a sixth possible implementation, when the bearer of the first device includes N paths, the initial status of the first bearer configuration includes initial statuses of the N paths, the initial status of each path is an activated state or a deactivated state, and the value of the first indication information is N bits or ranges from 0 to $2^{(N-1)}$, and is used to indicate the initial statuses of the N paths, where N is a positive integer greater than 1.

With reference to the second possible implementation of the first aspect, in a seventh possible implementation, when the bearer of the first device includes N paths, the initial status of the first bearer configuration includes initial statuses of N−1 paths in the N paths other than a primary path. The initial statuses of the N−1 paths include an activated state or a deactivated state. The value of the first indication information is M bits or ranges from 0 to $2^{(M-1)}$, and each of the M bits or each of M bits obtained after binary conversion is used to indicate that an initial status of each of at least one of the N−1 paths is the activated state or the deactivated state, where N is greater than M, and both N and M are positive integers greater than 1.

With reference to the second possible implementation of the first aspect, in an eighth possible implementation, when the bearer of the first device includes N paths, the initial status of the first bearer configuration includes initial statuses of the N paths. The initial status of each path is an activated state or a deactivated state. The value of the first indication information is M bits or ranges from 0 to $2^{(M-1)}$, and each of the M bits or each of M bits obtained after binary conversion is used to indicate that an initial status of each of at least one of the N paths is the activated state or the deactivated state, where N is greater than M, and both N and M are positive integers greater than 1.

With reference to any one of the third to the eighth possible implementations of the first aspect, in a ninth possible implementation, when the value of the first indication information is a plurality of bits or is a plurality of bits obtained after binary conversion, the plurality of bits are sorted in descending order of logical channel identifiers LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a master cell group LCID first and then a secondary cell group LCID, and sorting is performed in descending order of LCIDs of the plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in descending order of LCIDs of a plurality of paths in each cell group; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

With reference to the first aspect, in a tenth possible implementation of the first aspect, the first message includes second indication information, and the second indication information is used to indicate the bearer configuration.

With reference to the tenth possible implementation of the first aspect, in an eleventh possible implementation, the first message further includes third indication information, and the third indication information is used to indicate the initial status of the bearer configuration.

With reference to the eleventh possible implementation of the first aspect, in a twelfth possible implementation, when the bearer of the first device includes two paths, a value of the third indication information is used to indicate an initial status of the first bearer configuration, and the initial status includes an activated state or a deactivated state.

With reference to the tenth possible implementation of the first aspect, in a thirteenth possible implementation, when the bearer of the first device includes N paths, the initial status of the first bearer configuration includes initial statuses of N−1 paths in the N paths other than a primary path. The initial statuses of the N−1 paths each are an activated state or a deactivated state, and the value of the third indication information is one bit or ranges from 0 to 1, and is used to indicate the initial statuses of the N−1 paths, where N is a positive integer greater than 1.

With reference to the tenth possible implementation of the first aspect, in a fourteenth possible implementation, when the bearer of the first device includes N paths, the initial status of the first bearer configuration includes initial statuses of N−1 paths in the N paths other than a primary path. The initial statuses of the N−1 paths include an activated state or a deactivated state, and the value of the third indication information is N−1 bits or ranges from 0 to $2^{(N-1)}-1$, and is used to indicate the initial statuses of the N−1 paths, where N is a positive integer greater than 1.

With reference to the tenth possible implementation of the first aspect, in a fifteenth possible implementation, when the bearer of the first device includes N paths, the initial status of the first bearer configuration includes initial statuses of the N paths, the initial status of each path is an activated state or a deactivated state, and the value of the third indication information is N bits or ranges from 0 to $2^{(N-1)}$, and is used to indicate the initial statuses of the N paths, where N is a positive integer greater than 1.

With reference to the tenth possible implementation of the first aspect, in a sixteenth possible implementation, when the bearer of the first device includes N paths, the initial status of the first bearer configuration includes initial statuses of N−1 paths in the N paths other than a primary path. The initial statuses of the N−1 paths include an activated state or a deactivated state. The value of the third indication information is M bits or ranges from 0 to $2^{(M-1)}$, and each of the M bits or each of M bits obtained after binary conversion is used to indicate that an initial status of each of at least one of the N−1 paths is the activated state or the deactivated state, where N is greater than M, and both N and M are positive integers greater than 1.

With reference to the tenth possible implementation of the first aspect, in a seventeenth possible implementation, when the bearer of the first device includes N paths, the initial status of the first bearer configuration includes initial statuses of the N paths. The initial status of each path is an activated state or a deactivated state. The value of the third indication information is M bits or ranges from 0 to $2^{(M-1)}$, and each of the M bits or each of M bits obtained after binary conversion is used to indicate that an initial status of each of at least one of the N paths is the activated state or the deactivated state, where N is greater than M, and both N and M are positive integers greater than 1.

With reference to any one of the thirteenth to the seventeenth possible implementations of the first aspect, in an eighteenth possible implementation, when the value of the third indication information is a plurality of bits or is a plurality of bits obtained after binary conversion, the plurality of bits are sorted in descending order of LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a master cell group LCID first and then a secondary cell group LCID, and sorting is performed in descending order of LCIDs of the plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in descending order of LCIDs of a plurality of paths in each cell group; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

With reference to the first aspect, in a nineteenth possible implementation, the first message includes fourth indication information, and a value of the fourth indication information is used to indicate the bearer configuration and the initial status of the bearer configuration.

With reference to the first aspect, in a twentieth possible implementation, when the first message includes fifth indication information, it indicates that the bearer configuration is the second bearer configuration.

Alternatively, when the first message includes sixth indication information but does not include the fifth indication information, it indicates that the bearer configuration is the first bearer configuration, and an initial status of the first bearer configuration is an activated state.

Alternatively, when the first message includes neither the fifth indication information nor the sixth indication information, it indicates that the bearer configuration is the first bearer configuration, and an initial status of the first bearer configuration is a deactivated state.

With reference to any one of the first aspect and the first to the twentieth possible implementations of the first aspect, in a twenty-first possible implementation, the first bearer configuration is a duplication duplication bearer configuration; and/or the second bearer configuration is a split split bearer.

With reference to any one of the first aspect and the first to the twenty-first possible implementations of the first aspect, in a twenty-second possible implementation, the bearer of the first device is a data radio bearer or a signaling radio bearer.

According to a second aspect, a communication method is provided. The communication method includes:

A second device configures a bearer configuration of a bearer of a first device and an initial status of the bearer configuration.

The second device sends a first message to the first device. The first message is used to indicate the bearer configuration and the initial status of the bearer configuration, and the bearer configuration includes a first bearer configuration and/or a second bearer configuration.

In the technical solution in this embodiment of this application, the second device configures the bearer configuration of the bearer of the first device and the initial status of the bearer configuration, and sends the first message to the first device. The first message is used to indicate both the bearer configuration of the bearer of the first device and the initial status of the bearer configuration of the first device. This improves communication efficiency.

With reference to the second aspect, in a first possible implementation of the second aspect, when the first message includes first indication information, it indicates that the bearer configuration is the first bearer configuration.

Alternatively, when the first message does not include first indication information, it indicates that the bearer configuration is the second bearer configuration.

With reference to the first possible implementation of the second aspect, in a second possible implementation, when the first message includes the first indication information, a value of the first indication information is used to indicate an initial status of the first bearer configuration.

With reference to the second possible implementation of the second aspect, in a third possible implementation, when the bearer of the first device includes two paths, the value of the first indication information is used to indicate the initial status of the first bearer configuration, and the initial status includes an activated state or a deactivated state.

With reference to the second possible implementation of the second aspect, in a fourth possible implementation, when the bearer of the first device includes N paths, the initial status of the first bearer configuration includes initial statuses of N−1 paths in the N paths other than a primary path, the initial statuses of the N−1 paths each are an activated state or a deactivated state, and the value of the first indication information is one bit or ranges from 0 to 1, and is used to indicate the initial statuses of the N−1 paths, where N is a positive integer greater than 1.

With reference to the second possible implementation of the second aspect, in a fifth possible implementation, when the bearer of the first device includes N paths, the initial status of the first bearer configuration includes initial statuses of N−1 paths in the N paths other than a primary path. The initial statuses of the N−1 paths include an activated state or a deactivated state, and the value of the first indication information is N−1 bits or ranges from 0 to $2^{(N-1)}-1$ and is used to indicate the initial statuses of the N−1 paths, where N is a positive integer greater than 1.

With reference to the second possible implementation of the second aspect, in a sixth possible implementation, when the bearer of the first device includes N paths, the initial status of the first bearer configuration includes initial statuses of the N paths, the initial status of each path is an activated state or a deactivated state, and the value of the first indication information is N bits or ranges from 0 to $2^{(N-1)}$, and is used to indicate the initial statuses of the N paths, where N is a positive integer greater than 1.

With reference to the second possible implementation of the second aspect, in a seventh possible implementation, when the bearer of the first device includes N paths, the initial status of the first bearer configuration includes initial statuses of N−1 paths in the N paths other than a primary path. The initial statuses of the N−1 paths include an activated state or a deactivated state. The value of the first indication information is M bits or ranges from 0 to $2^{(M-1)}$, and each of the M bits or each of M bits obtained after binary conversion is used to indicate that an initial status of each of at least one of the N−1 paths is the activated state or the deactivated state, where N is greater than M, and both N and M are positive integers greater than 1.

With reference to the second possible implementation of the second aspect, in an eighth possible implementation, when the bearer of the first device includes N paths, the initial status of the first bearer configuration includes initial statuses of the N paths. The initial status of each path is an activated state or a deactivated state. The value of the first indication information is M bits or ranges from 0 to $2^{(M-1)}$, and each of the M bits or each of M bits obtained after binary conversion is used to indicate that an initial status of each of at least one of the N paths is the activated state or the deactivated state, where N is greater than M, and both N and M are positive integers greater than 1.

With reference to any one of the third to the eighth possible implementations of the second aspect, in a ninth possible implementation, when the value of the first indication information is a plurality of bits or is a plurality of bits obtained after binary conversion, the plurality of bits are sorted in descending order of logical channel identifiers LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a master cell group LCID first and then a secondary cell group LCID, and sorting is performed in descending order of LCIDs of the plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in descending order of LCIDs of a plurality of paths in each cell group; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

With reference to the second aspect, in a tenth possible implementation of the second aspect, the first message includes second indication information, and the second indication information is used to indicate the bearer configuration.

With reference to the tenth possible implementation of the second aspect, in an eleventh possible implementation, the first message further includes third indication information, and the third indication information is used to indicate the initial status of the bearer configuration.

With reference to the eleventh possible implementation of the second aspect, in a twelfth possible implementation, when the bearer of the first device includes two paths, a value of the third indication information is used to indicate an initial status of the first bearer configuration, and the initial status includes an activated state or a deactivated state.

With reference to the tenth possible implementation of the second aspect, in a thirteenth possible implementation, when the bearer of the first device includes N paths, the initial status of the first bearer configuration includes initial statuses of N−1 paths in the N paths other than a primary path, the initial statuses of the N−1 paths each are an activated state or a deactivated state, and the value of the third indication information is one bit or ranges from 0 to 1, and is used to indicate the initial statuses of the N−1 paths, where N is a positive integer greater than 1.

With reference to the eleventh possible implementation of the second aspect, in a fourteenth possible implementation, when the bearer of the first device includes N paths, the initial status of the first bearer configuration includes initial statuses of N−1 paths in the N paths other than a primary path. The initial statuses of the N−1 paths include an activated state or a deactivated state, and the value of the third indication information is N−1 bits or ranges from 0 to $2^{(N-1)}-1$, and is used to indicate the initial statuses of the N−1 paths, where N is a positive integer greater than 1.

With reference to the tenth possible implementation of the second aspect, in a fifteenth possible implementation, when the bearer of the first device includes N paths, the initial status of the first bearer configuration includes initial statuses of the N paths, the initial status of each path is an activated state or a deactivated state, and the value of the third indication information is N bits or ranges from 0 to $2^{(N-1)}$, and is used to indicate the initial statuses of the N paths, where N is a positive integer greater than 1.

With reference to the eleventh possible implementation of the second aspect, in a sixteenth possible implementation, when the bearer of the first device includes N paths, the initial status of the first bearer configuration includes initial statuses of N−1 paths in the N paths other than a primary path. The initial statuses of the N−1 paths include an activated state or a deactivated state. The value of the third indication information is M bits or ranges from 0 to $2^{(M-1)}$, and each of the M bits or each of M bits obtained after binary conversion is used to indicate that an initial status of each of at least one of the N−1 paths is the activated state or the deactivated state, where N is greater than M, and both N and M are positive integers greater than 1.

With reference to the eleventh possible implementation of the second aspect, in a seventeenth possible implementation, when the bearer of the first device includes N paths, the initial status of the first bearer configuration includes initial statuses of the N paths. The initial status of each path is an activated state or a deactivated state. The value of the third indication information is M bits or ranges from 0 to $2^{(M-1)}$, and each of the M bits or each of M bits obtained after binary conversion is used to indicate that an initial status of each of at least one of the N paths is the activated state or the deactivated state, where N is greater than M, and both N and M are positive integers greater than 1.

With reference to any one of the thirteenth to the seventeenth possible implementations of the second aspect, in an eighteenth possible implementation, when the value of the third indication information is a plurality of bits or is a plurality of bits obtained after binary conversion, the plurality of bits are sorted in descending order of LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a master cell group LCID first and then a secondary cell group LCID, and sorting is performed in descending order of LCIDs of the plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in descending order of LCIDs of a plurality of paths in each cell group; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

With reference to the second aspect, in a nineteenth possible implementation of the second aspect, the first message includes fourth indication information, and a value of the fourth indication information is used to indicate the bearer configuration and the initial status of the bearer configuration.

With reference to the second aspect, in a twentieth possible implementation of the second aspect, when the first message includes fifth indication information, it indicates that the bearer configuration is the second bearer configuration.

Alternatively, when the first message includes sixth indication information but does not include the fifth indication information, it indicates that the bearer configuration is the first bearer configuration, and an initial status of the first bearer configuration is an activated state.

Alternatively, when the first message includes neither the fifth indication information nor the sixth indication information, it indicates that the bearer configuration is the first bearer configuration, and an initial status of the first bearer configuration is a deactivated state.

With reference to any one of the second aspect and the first to the twentieth possible implementations of the second aspect, in a twenty-first possible implementation, the first bearer configuration is a duplication duplication bearer configuration; and/or the second bearer configuration is a split split bearer.

With reference to any one of the second aspect and the first to the twenty-first possible implementations of the second aspect, in a twenty-second possible implementation, the bearer of the first device is a data radio bearer or a signaling radio bearer.

According to a third aspect, a communications device is provided. The communications device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the communications device is enabled to perform the method according to the first aspect and any possible implementation of the first aspect.

According to a fourth aspect, a communications device is provided. The communications device includes a processor, a transceiver, and a memory. The processor, the transceiver, and the memory communicate with each other through an internal connection path. The memory is configured to store an instruction, and the processor is configured to execute the instruction stored in the memory. When the processor executes the instruction stored in the memory, the communications device is enabled to perform the method according to the second aspect and any possible implementation of the second aspect.

According to a fifth aspect, a communications device is provided. The communications device is configured to perform the method according to the first aspect and any possible implementation of the first aspect. Specifically, the communications device includes a module configured to perform the method according to the first aspect and any possible implementation of the first aspect.

According to a sixth aspect, a communications device is provided. The communications device is configured to perform the method according to the second aspect and any possible implementation of the second aspect. Specifically, the communications device includes a module configured to perform the method according to the second aspect and any possible implementation of the second aspect.

According to a seventh aspect, a chip system is provided. The chip system is applied to a communications device. The chip system includes at least one processor, at least one memory, and an interface circuit. The interface circuit is responsible for information exchange between the chip system and the outside. The at least one memory, the interface circuit, and the at least one processor are connected to each other through a line. The at least one memory stores an instruction, and the instruction is executed by the at least one processor, to perform an operation performed by the communications device in the methods according to the foregoing aspects.

According to an eighth aspect, a communications system is provided. The communications system includes a communications device. The communications device is the communications device in the foregoing aspects.

According to a ninth aspect, a computer program product is provided. The computer program product is applied to a communications device. The computer program product includes a series of instructions, and the instructions are run, to perform an operation performed by the communications device in the methods according to the foregoing aspects.

According to a tenth aspect, a computer-readable storage medium is provided. The computer-readable storage medium stores an instruction, and when the instruction is run on a computer, the computer is enabled to perform the methods according to the foregoing aspects.

DETAILED DESCRIPTION OF ILLUSTRATIVE EMBODIMENTS

Figure 1:
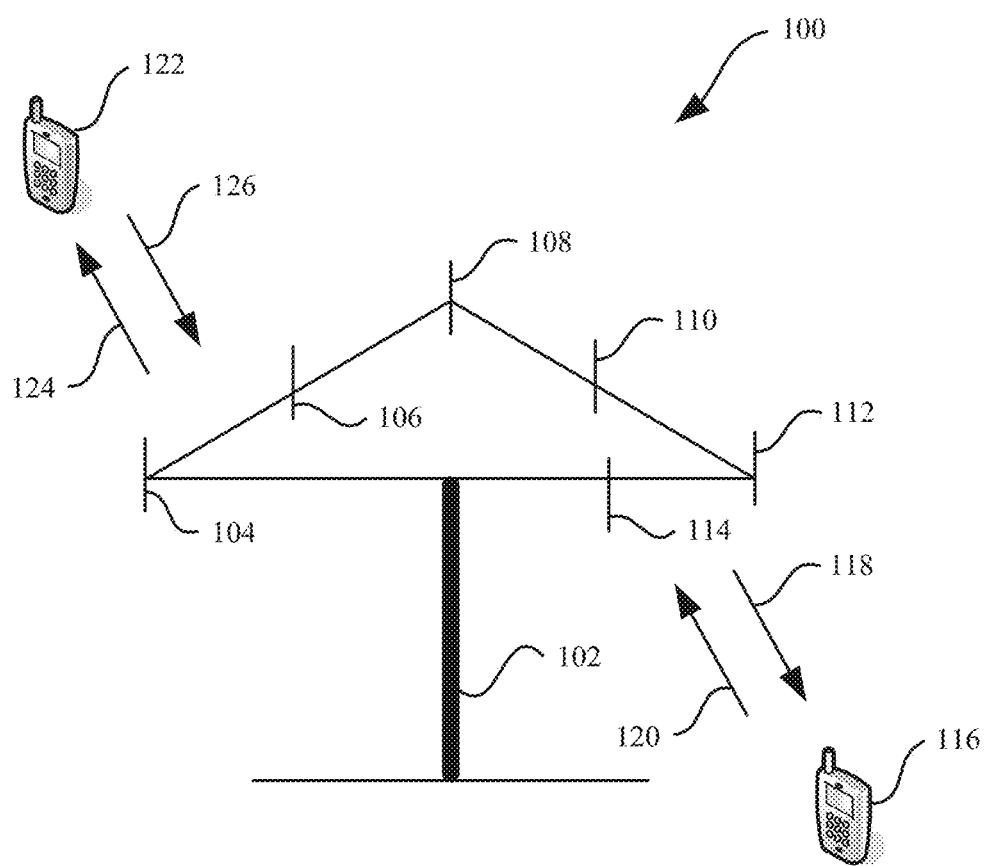
FIG. 1 is a schematic diagram of a communications system to which a data unit processing method of this application is applicable.

The following describes technical solutions in this application with reference to accompanying drawings.

Terminologies such as "component", "module", and "system" used in this application are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As shown in figures, both a computing device and an application that runs on a computing device may be components. One or more components may reside within a process and/or an execution thread, and a component may be located on one computer and/or distributed between two or more computers. In addition, these components may be executed from various computer-readable media that store various data structures. For example, the components may communicate by using a local and/or remote process and based on a signal having one or more data packets (for example, data from two components interacting with another component in a local system, a distributed system, and/or across a network such as the internet interacting with another system by using the signal).

It should be understood that division of manners, cases, types, and embodiments in the embodiments of this application are merely for ease of description, but should not constitute any special limitation, and features in various manners, types, cases, and embodiments may be combined when there is no contradiction.

It should be further understood that in the embodiments of this application, "first", "second", "third", and the like are merely intended to indicate different objects, and do not represent other limitations on the indicated objects.

The technical solution of the embodiments of this application may be applied to various communications systems, such as: a global system for mobile communication (Global System for Mobile Communications, GSM) system, a code division multiple access (Code Division Multiple Access, CDMA) system, a wideband code division multiple access (Wideband Code Division Multiple Access, WCDMA) system, a general packet radio service (General Packet Radio Service, GPRS), a long term evolution (Long Term Evolution, LTE) system, an LTE frequency division duplex (Frequency Division Duplex, FDD) system, an LTE time division duplex (Time Division Duplex, TDD), a universal mobile telecommunications system (Universal Mobile Telecommunications System, UMTS), a worldwide interoperability for microwave access (Worldwide Interoperability for Microwave Access, WiMAX) communications system, a future 5th generation (5th Generation, 5G) system, or a new radio (New Radio, NR) system.

A communication method in this application may be performed by a terminal device or a network device (namely, a first device).

The terminal device may also be referred to as user equipment (user equipment, UE), an access terminal, a subscriber unit, a subscriber station, a mobile station, a remote station, a remote terminal, a mobile device, a user terminal, a terminal, a wireless communications device, a user agent, a user apparatus, or the like. The terminal device may be a station (STATION, ST) in a WLAN, and may be a cellular phone, a cordless phone, a Session Initiation Protocol (Session Initiation Protocol, SIP) phone, a wireless local loop (Wireless Local Loop, WLL) station, a personal digital assistant (Personal Digital Assistant, PDA) device, a handheld device with a wireless communication function, a computing device, or another processing device connected to a wireless modem, a vehicle-mounted device, an internet of vehicles terminal, a computer, a laptop computer, a handheld communications device, a handheld computing device, a satellite wireless device, a wireless modem card, and a television set top box (set top box, STB), customer premises equipment (customer premise equipment, CPE) and/or another device configured to perform communication in a wireless system and a next generation communications system, for example, a terminal device in a 5G network or a terminal device in a future evolved public land mobile network (Public Land Mobile Network, PLMN) network.

As an example instead of a limitation, in the embodiments of this application, the terminal device may alternatively be a wearable device. The wearable device may also be referred to as a wearable intelligent device, and is a general term for wearable devices that are developed by applying wearable technologies to perform intelligent design on daily wear, for example, glasses, gloves, watches, clothes, and shoes. The wearable device is a portable device that is directly worn on a body or integrated into clothes or an accessory of a user. The wearable device is not only a hardware device, but also a device for implementing a powerful function through software support, data exchange, and cloud interaction. In a broad sense, wearable intelligent devices include full-featured and large-sized devices that can implement complete or partial functions without depending on smartphones, such as smart watches or smart glasses, and devices that focus on only one type of application functions and need to work with other devices such as smartphones, for example, various smart bands, or smart jewelry for physical sign monitoring.

In addition, in the embodiments of this application, the terminal device may alternatively be a terminal device in an internet of things (Internet of Things, IoT) system. The IoT is an important part in future development of information technologies. A main technical feature of the IoT is to connect an object to a network through a communications technology, to implement an intelligent network of human-thing interconnection and thing-thing interconnection.

The network device may be an access network device or a core network device.

The access network device may be a device configured to communicate with a mobile device. The access network device may be an access point (access point, AP) in a WLAN, a base station (base transceiver station, BTS) in GSM or CDMA, a nodeB (nodeB, NB) in WCDMA, a gNB in a new radio (New Radio, NR) system, an evolved NodeB (evolutional node B, eNB or eNodeB), a relay station, an access point, a roadside unit (Roadside Unit, RSU), a vehicle-mounted device, or a wearable device in LTE, an access network device in a future 5G network, an access network device in a future evolved PLMN network, or the like.

In addition, in the embodiments of this application, the access network device provides a service for a cell, and the terminal device communicates with the network device by using a transmission resource (for example, a time domain resource, a frequency domain resource, or a spectrum resource) used by the cell. The cell may be a cell corresponding to the access network device (for example, a base station). The cell may belong to a macro base station, or may belong to a base station corresponding to a small cell (small cell). The small cell herein may include a metro cell (Metro cell), a micro cell (Micro cell), a pico cell (Pico cell), a femto cell (Femto cell), and the like. These small cells have characteristics of small coverage areas and low transmit power, and are applicable to providing a high-rate data transmission service.

In addition, a plurality of cells may work simultaneously in a same frequency band on a carrier in the LTE system or the 5G system. In some special scenarios, the concept of the carrier is considered equivalent to that of the cell. For example, in a carrier aggregation (Carrier Aggregation, CA) scenario, when a secondary carrier is configured for UE, both a carrier index of the secondary carrier and a cell identifier (Cell Identify, Cell ID) of a secondary cell working on the secondary carrier are carried. In this case, it may be considered that the concept of the carrier is equivalent to the concept of the cell. For example, that the UE accesses a carrier is equivalent to that the UE accesses a cell.

In addition, a carrier (carrier) in the embodiments of this application has a same concept as a carrier in carrier aggregation (carrier aggregation), and may also be understood as a band (band), a sub-band (sub-band), a BWP (Bandwidth part, bandwidth part), a channel (channel), a sub-channel (sub-channel), a spectrum resource, or the like. The carrier is represented as a set of subcarriers in frequency domain. Different carriers or frequency bands may have different center frequencies. There may also be a same center frequency, for example, frequency bands with different bandwidths but a same center frequency.

A core network device may be connected to a plurality of access network devices, and configured to control the access network devices; and can distribute, to the access network devices, data received from a network side (for example, the internet).

The foregoing listed functions and specific implementations of the terminal device, the access network device, and the core network device are merely examples for description, and this application is not limited thereto.

In the embodiments of this application, the terminal device or the network device includes a hardware layer, an operating system layer running above the hardware layer, and an application layer running above the operating system layer. The hardware layer includes hardware such as a central processing unit (Central Processing Unit, CPU), a memory management unit (Memory Management Unit, MMU), and a memory (also referred to as a main memory). The operating system may be any one or more computer operating systems, such as a Linux operating system, a Unix operating system, an Android operating system, an iOS operating system, or a Windows operating system, that implement service processing through a process (Process). The application layer includes applications such as a browser, an address book, word processing software, and instant communications software. In addition, a specific structure of an execution body of a method provided in the embodiments of this application is not specifically limited in the embodiments of this application provided that a program that records code for the method provided in the embodiments of this application can be run to perform communication according to the method provided in the embodiments of this application. For example, the execution body of the method provided in the embodiments of this application may be a terminal device, a network device, or a function module that can invoke and execute the program in a terminal device or a network device.

FIG. 1 is a schematic diagram of a communications system to which a data unit processing method of this application is applicable. As shown in FIG. 1, the communications system 100 includes a network device 102, and the network device 102 may include a plurality of antennas, for example, antennas 104, 106, 108, 110, 112, and 114. In addition, the network device 102 may additionally include a transmitter chain and a receiver chain. A person of ordinary skill in the art may understand that the transmitter chain and the receiver chain each may include a plurality of components (for example, a processor, a modulator, a multiplexer, an encoder, a demultiplexer, or an antenna) related to signal sending and receiving.

The network device 102 may communicate with a plurality of terminal devices (for example, a terminal device 116 and a terminal device 122). However, it may be understood that the network device 102 may communicate with any quantity of terminal devices that are similar to the terminal device 116 or 122. The terminal devices 116 and 122 each may be, for example, a cellular phone, a smartphone, a portable computer, a handheld communications device, a handheld computing device, a satellite radio apparatus, a global positioning system, a PDA, and/or any other proper device used for communication in the wireless communications system 100.

As shown in FIG. 1, the terminal device 116 communicates with the antennas 112 and 114. The antennas 112 and 114 send information to the terminal device 116 over a forward link 118, and receive information from the terminal device 116 over a reverse link 120. In addition, the terminal device 122 communicates with the antennas 104 and 106. The antennas 104 and 106 send information to the terminal device 122 over a forward link 124, and receive information from the terminal device 122 over a reverse link 126.

For example, in an FDD system, for example, the forward link 118 may use a frequency band different from that used by the reverse link 120, and the forward link 124 may use a frequency band different from that used by the reverse link 126.

For another example, in a TDD system and a full duplex (full duplex) system, the forward link 118 and the reverse link 120 may use a common frequency band, and the forward link 124 and the reverse link 126 may use a common frequency band.

Each antenna (or an antenna group including a plurality of antennas) and/or each area that are/is designed for communication are/is referred to as a sector of the network device 102. For example, an antenna group may be designed to communicate with a terminal device in the sector within coverage of the network device 102. In a process in which the network device 102 communicates with the terminal devices 116 and 122 respectively over the forward links 118 and 124, a transmit antenna of the network device 102 can improve signal-to-noise ratios of the forward links 118 and 124 through beamforming. In addition, in comparison with a manner in which the network device sends, by using a single antenna, a signal to all terminal devices served by the network device, when the network device 102 sends, through beamforming, a signal to the terminal devices 116 and 122 that are randomly distributed within related coverage, less interference is caused to a mobile device in a neighboring cell.

In a given time, the network device 102, the terminal device 116, or the terminal device 122 may be a wireless communications sending apparatus and/or a wireless communications receiving apparatus. When sending data, the wireless communications sending apparatus may encode the data for transmission. Specifically, the wireless communications sending apparatus may obtain (for example, generate, receive from another communications apparatus, or store in a memory) a particular quantity of data bits to be sent on a channel to the wireless communications receiving apparatus. The data bits may be included in a transport block (or a plurality of transport blocks) of the data, and the transport block may be segmented to generate a plurality of code blocks.

In addition, the communications system 100 may be a PLMN network, a device-to-device (device-to-device, D2D) network, a machine-to-machine (machine to machine, M2M) network, or another network. FIG. 1 is merely a simplified schematic diagram of an example. The network may further include another network device which is not shown in FIG. 1.

Duplication is a new feature introduced in 5G NR. Two same data units are generated at a PDCP layer and transmitted to two connected RLC layers. A protocol stack architecture configured for dual-connectivity-based duplication is the same as a protocol stack architecture configured for a current split bearer. Therefore, distinguished configuration for the two cases needs to be indicated. In addition, the applicant finds that an initial status of duplication cannot be indicated to the terminal device currently. The initial status may be understood as a status about whether configured duplication works after the terminal device receives the configuration information. Currently, in a new radio interface of 5G, how to indicate an initial status of a bearer configured with duplication has not been specified.

The following describes in detail the embodiments of this application with reference to specific examples. It should be noted that the foregoing examples are merely intended to help a person skilled in the art better understand the embodiments of the present invention, but are not intended to limit the scope of the embodiments of the present invention.

Figure 2:
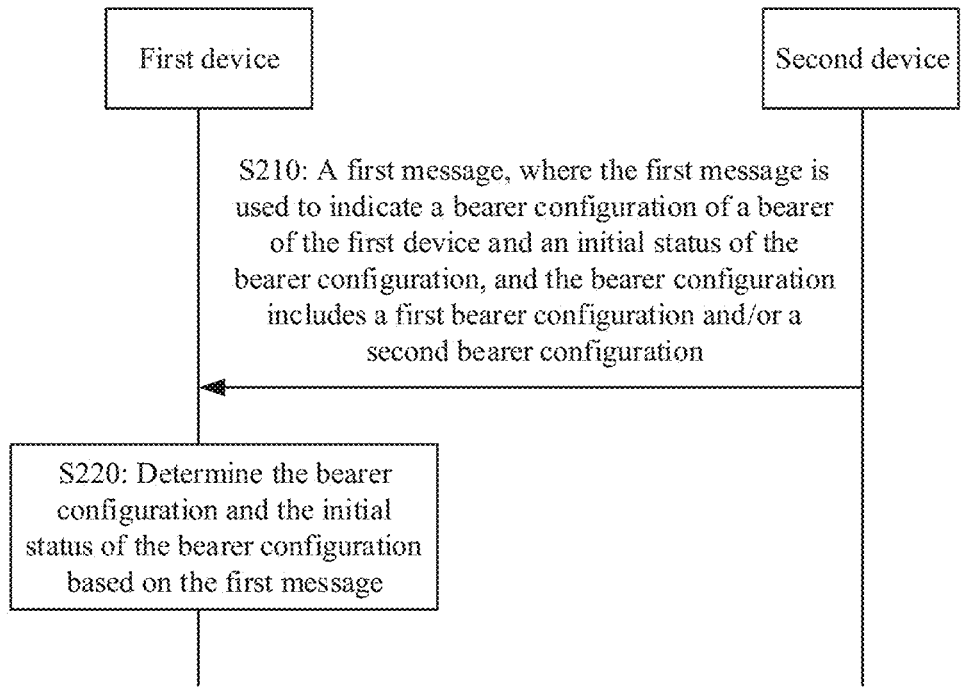
FIG. 2 is a schematic interaction diagram of a communication method according to an embodiment of this application.

FIG. 2 is an interaction flowchart of a communication method according to an embodiment of this application. In FIG. 2, a first device may be any terminal device in FIG. 1, and a second device may be a base station. 210. The second device sends a first message to the first device. The first message is used to indicate a bearer configuration of a bearer of the first device and an initial status of the bearer configuration, and the bearer configuration includes a first bearer configuration and/or a second bearer configuration.

It should be understood that before the second device sends the first message to the first device, the second device configures the bearer configuration of the bearer of the first device and the initial status of the bearer configuration. It should be understood that the initial status is a status configured after the bearer configuration is received.

It should be noted that the bearer of the first device may be a data radio bearer, or may be a signaling radio bearer. The bearer configuration may include the first bearer configuration and the second bearer configuration, or may include the first bearer configuration, the second bearer configuration, and a third bearer configuration. The bearer configuration includes at least the first bearer configuration and the second bearer configuration.

The first bearer configuration may be to configure a bearer with a duplication (duplication) function, and the duplication is a new feature introduced in 5G NR. The duplication function is proposed to ensure high reliability and low latency in a data transmission process. To be specific, a data unit to be sent is replicated at a PDCP layer into two data units, and the two data units are sent on two paths. In a future technology, a data unit may be replicated into a plurality of data units through duplication, and the plurality of data units are sent on a plurality of paths.

The second bearer configuration may be to configure a split (split) bearer. The split bearer allows different data units to be transmitted on two paths. In a future technology, the split bearer may also allow different data units to be transmitted on two or more paths.

The initial status includes an activated state and a deactivated state. In an example in which a bearer configured with duplication is configured with two paths, an activated state of the bearer configured with duplication means that same data units start to be transmitted on the two paths, and a deactivated state of the bearer configured with duplication means that only a primary path in the two paths is working. In an example in which a bearer configured with duplication is configured with a plurality of paths, the initial status includes an activated state or a deactivated state of each path.

It should be understood that, for the two paths, the bearer configured with duplication is a bearer for which the PDCP layer is connected to two RLC layers, and one protocol data unit (Protocol Data Unit, PDU) may be replicated into two same PDUs at the PDCP layer, and the bearer is capable of transmitting data to the two RLC layers. The split bearer is a bearer for which the PDCP layer is connected to two RLC layers, and different PDUs are transmitted at the PDCP layer to the two RLC layers. The RLC layer to which data is transmitted can be selected based on a configured threshold.

It should be noted that the primary path (Primary Path) is a path of the first bearer or the second bearer configured for the first device. For example, the first message includes an indication identifier indicating the primary path. In a possible implementation of this embodiment of this application, the primary path is always in the activated state or a working state. In another possible implementation of this embodiment of this application, the initial status of the primary path may be indicated by using the first message.

It should be understood that, in this embodiment of this application, the first bearer configuration may be in the activated state or the deactivated state, and the second bearer configuration may also be in the activated state or the deactivated state.

220. The first device determines the bearer configuration and the initial status of the bearer configuration based on the first message.

The first device determines, based on the first message sent by the second device, the bearer configuration of the first device and the initial status of the bearer configuration. The first message is used to indicate the bearer configuration of the bearer of the first device and the initial status of the bearer configuration.

In the technical solution of this embodiment of this application, the first device receives the first message sent by the second device, and determines both the bearer configuration of the bearer of the first device and the initial status of the bearer configuration based on the first message, thereby improving communication efficiency and reducing signaling overheads.

The following describes specific content of the first message in detail. The first message includes but is not limited to the following content.

Manner 1

In this embodiment of this application, when the first message includes first indication information, it indicates that the bearer configuration of the first device is the first bearer configuration; or when the first message does not include first indication information, it indicates that the bearer configuration of the first device is the second bearer configuration.

For example, the first bearer may be a bearer configured with duplication, and the second bearer may be a split bearer. When the first message includes the following first indication information, it indicates the bearer configured with duplication:

pdcp-Duplication (if the first message includes this field, the bearer of the first device is the bearer configured with duplication; or if the first message does not include the field, the bearer of the first device is the split bearer), which is used as an example for description herein and is not particularly limited.

In this embodiment of this application, when the first indication information is present in the first message, it indicates that the first device is to use the first bearer configuration, in other words, the first device is configured with the bearer with duplication. In this case, the value of the first indication information is used to indicate that the bearer of the first device is in the initial status when the first bearer is configured.

For example, a value of the pdcp-Duplication is used to indicate the activated state and the deactivated state of the bearer configured with duplication.

In an embodiment of this application, when the bearer of the first device includes two paths, the value of the first indication information is used to indicate the initial status of the first bearer configuration, and the initial status includes the activated state or the deactivated state.

When the bearer of the first device includes two paths, one bit may be used to indicate the initial status of the first bearer, that is, one bit is used to indicate the activated state and the deactivated state of the bearer configured with duplication of the first device.

When the bearer of the first device includes two paths, a value range of 0 to 1 may be used to indicate the activated state or the deactivated state of the first bearer.

For example, "1" may be used to indicate that the two paths are both in the activated state, and "0" may be used to indicate that the two paths are both in the deactivated state. An activated state of the bearer configured with duplication means that same PDUs are transmitted on the two paths. A deactivated state of the bearer configured with duplication means that only a primary path is in a working state.

It should be understood that, in this embodiment of this application, the primary path is a path that is always in a working state when the bearer of the first device includes a plurality of paths and all the paths are in the deactivated state of the bearer configured with duplication. The first message includes an identifier of the primary path when the indication information is used to indicate the plurality of paths.

When the bearer of the first device includes two paths, two bits may be used to indicate the initial status of the first bearer, that is, two bits are used to indicate the activated state and the deactivated state of the bearer configured with duplication of the first device.

For example, "11" may be used to indicate that the two paths are both in the activated state. "10" may be used to indicate that the first path is in the activated state, and the second path is in the deactivated state. "01" may be used to indicate that the first path is in the deactivated state, and the second path is in the activated state. "00" may be used to indicate that the two paths are both in the deactivated state. It should be noted that different paths have different logical channel identifiers (Logical Channel Identify, LCID), and the different paths are distinguished based on the LCIDs.

In this embodiment of this application, when the bearer of the first device includes N paths, the initial status of the first bearer configuration may include initial statuses of N−1 paths in the N paths other than a primary path. The initial statuses of the N−1 paths each are an activated state or a deactivated state. A value of the first indication information may include one bit, and the one bit is used to indicate the initial statuses of the N−1 paths, where N is a positive integer greater than 1.

For example, when the bearer of the first device includes four paths, one bit may be used to indicate initial statuses of three paths other than the primary path in the four paths included in the bearer of the first device. In other words, one bit is used to indicate the activated state or the deactivated state of the bearer configured with duplication of the first device.

For example, "1" may be used to indicate that the three paths each are in an activated state, and "0" may be used to indicate that the three paths each are in a deactivated state. An activated state of the bearer configured with duplication means that same PDUs are transmitted on the three paths. The deactivated state of the bearer configured with duplication means that only the primary path is in the working state.

In an embodiment of this application, when the bearer of the first device includes N paths, the initial status of the first bearer configuration may include initial statuses of N−1 paths in the N paths other than a primary path. The initial statuses of the N−1 paths include an activated state or a deactivated state. The value of the first indication information may include N−1 bits, or the value of the first indication information ranges from 0 to $2^{(N-1)}-1$. The N−1 bits are used to indicate the initial statuses of the N−1 paths, and N is a positive integer greater than 1.

It should be understood that the primary path is always in a working state. Therefore, when the bearer of the first device includes the N paths, only the initial statuses of the N−1 paths other than the primary path need to be determined. The initial statuses of the N−1 paths include an activated state and a deactivated state. If any one of the N−1 paths is in the activated state, it indicates that same PDUs are transmitted on the path and the primary path.

For example, when the bearer of the first device includes four paths, three bits may be used to indicate initial statuses of the three paths other than the primary path of the first bearer. In other words, the three bits are used to indicate the activated state and the deactivated state of the three paths other than the primary path of the first device in the bearer configured with duplication, and the initial status of the primary path is not indicated.

When the value of the first indication information is three bits, the three bits respectively indicate initial statuses of the first path, the second path, and the third path other than the primary path.

For example, "111" may be used to indicate that the three paths each are in an activated state; "110" may be used to indicate that the first path and the second path are in an activated state, and the third path is in a deactivated state; "101" may be used to indicate that the first path and the third path are in an activated state, and the second path is in a deactivated state; "100" may be used to indicate that the first path is in an activated state, and the second path and the third path are in a deactivated state; "011" may be used to indicate that the first path is in a deactivated state, and the second path and the third path are in an activated state; "010" may be used to indicate that the first path and the third path are in a deactivated state, and the second path is in an activated state; "001" may be used to indicate that the first path and the second path are in a deactivated state, and the third path is in an activated state; and "000" may be used to indicate that the three paths each are in a deactivated state. It should be understood that, alternatively, "0" may indicate "activated state" and "1" may indicate "deactivated state" herein. This is not limited in this application.

A sequence of the indicated first path, second path, and third path, that is, a correspondence between three bits and the configured paths may be:

sorting is performed in descending order of logical channel identifiers LCIDs of the three paths; or sorting is performed in ascending order of LCIDs of the three paths; or sorting is performed in an order of configuring LCIDs of the three paths; or sorting is performed in an order of cell groups to which LCIDs of the three paths belong, to be specific, sorting is performed in an order of a master cell group LCID first and then a secondary cell group LCID, and sorting is performed in ascending or descending order of LCIDs in each cell group; or sorting is performed in an order of cell groups to which LCIDs of the three paths belong, to be specific, sorting is performed in an order of a secondary cell group LCID first and then a master cell group LCID, and sorting is performed in ascending or descending order of LCIDs in each cell group; or sorting is performed in descending order of LCIDs of the three paths, and when LCIDs have a same value, sorting is performed in an order of a master cell group first and then a secondary cell group, or sorting is performed in an order of a secondary cell group first and then a master cell group; or sorting is performed in ascending order of LCIDs of the three paths, and when LCIDs have a same value, sorting is performed in an order of a master cell group first and then a secondary cell group, or sorting is performed in an order of a secondary cell group first and then a master cell group.

In an embodiment of this application, sorting is performed in an order of configuring logical channel identifiers LCIDs of the three paths.

For example, it is assumed that the first indication information indicates initial statuses of the three paths, LCID values of the three paths are 5, 7, and 8, and a configuration order or a configuration time sequence is 8, 7, and 5. In this case, the first path is the path whose LCID is 8, the second path is the path whose LCID is 7, and the second path is the path whose LCID is 5.

In an embodiment of this application, sorting is performed in descending order of logical channel identifiers LCIDs of the three paths.

For example, it is assumed that the first indication information indicates initial statuses of the three paths, and LCID values of the three paths are 5, 7, and 8. In this case, the first path is the path whose LCID is 8, the second path is the path whose LCID is 7, and the second path is the path whose LCID is 5.

In an embodiment of this application, sorting is performed in ascending order of logical channel identifiers LCIDs of the three paths.

For example, it is assumed that the first indication information indicates initial statuses of the three paths, and LCID values of the three paths are 5, 7, and 8. In this case, the first path is the path whose LCID is 5, the second path is the path whose LCID is 7, and the second path is the path whose LCID is 8.

In an embodiment of this application, sorting is performed in an order of cell groups to which LCIDs of the three paths belong, to be specific, sorting is performed in an order of a master cell group LCID first and then a secondary cell group LCID, and sorting is performed in ascending order of LCIDs in each cell group.

Figure 3:
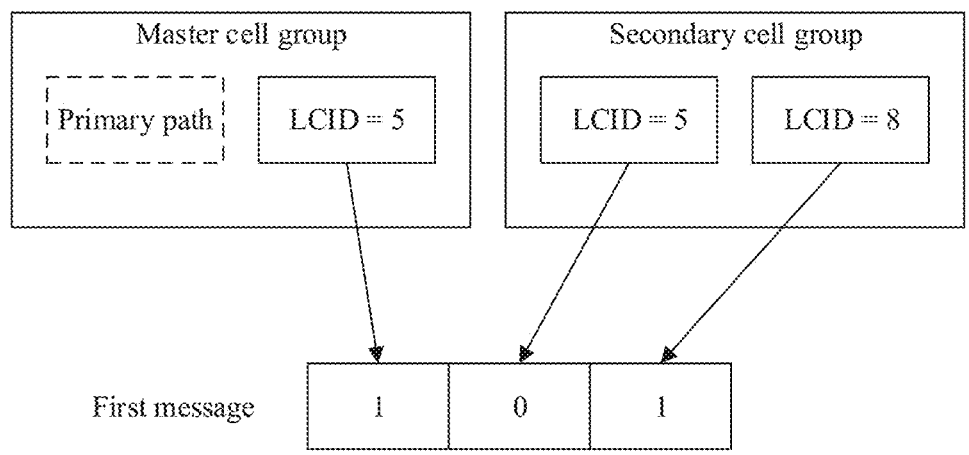
FIG. 3 is a schematic diagram in which a first message indicates initial statuses of a plurality of paths according to an embodiment of this application.

FIG. 3 is a schematic diagram in which a first message indicates initial statuses of a plurality of paths according to an embodiment of this application. As shown in FIG. 3, it is assumed that first indication information included in the first message indicates initial statuses of three paths other than a primary path. The three paths are respectively a path whose LCID value is 5 in a master cell group (Master Cell Group, MCG), a path whose LCID value is 5 in a secondary cell group (SCG), and a path whose LCID value is 8 in the secondary cell group (Secondary Cell Group, SCG). A plurality of bits may be sorted in an order of cell groups to which the LCIDs of the three paths belong, to be specific, sorting is performed in an order of a master cell group LCID first and then a secondary cell group LCID, and sorting is performed in ascending order of LCIDs in each cell group.

It should be noted that the master cell group (MCG) is a group of serving/communication cells associated with a master base station and/or provided or served by a master base station, and the secondary cell group (SCG) is a group of serving/communication cells associated with a secondary base station and/or provided or served by a secondary base station.

For example, as shown in FIG. 3, the first bit indicates a first path, and the first path is the path whose MCG LCID is 5; the second bit indicates a second path, and the second path is the path whose SCG LCID is 5; and the third bit indicates a third path, and the third path is the path whose SCG LCID is 8.

In an embodiment of this application, sorting is performed in an order of the cell groups to which the LCIDs of the three paths belong, to be specific, sorting is performed in an order of a master cell group LCID first and then a secondary cell group LCID, and sorting is performed in descending order of LCIDs in each cell group.

Figure 4:
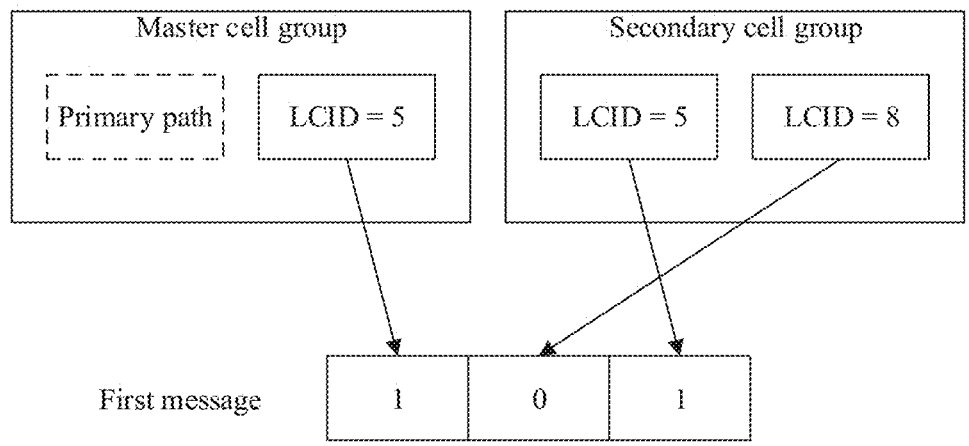
FIG. 4 is a schematic diagram in which a first message indicates initial statuses of a plurality of paths according to another embodiment of this application.

FIG. 4 is a schematic diagram in which a first message indicates initial statuses of a plurality of paths according to another embodiment of this application. As shown in FIG. 4, it is assumed that first indication information included in the first message indicates initial statuses of three paths other than a primary path. The three paths are respectively a path whose LCID value is 5 in a master cell group (MCG), a path whose LCID value is 5 in a secondary cell group (SCG), and a path whose LCID value is 8 in the secondary cell group (SCG). A plurality of bits may be sorted in an order of cell groups to which the LCIDs of the three paths belong, to be specific, sorting is performed in an order of a master cell group LCID first and then a secondary cell group LCID, and sorting is performed in descending order of LCIDs in each cell group.

For example, as shown in FIG. 4, the first bit indicates a first path, and the first path is the path whose MCG LCID is 5; the second bit indicates a second path, and the second path is the path whose SCG LCID is 8; and the third bit indicates a third path, and the third path is the path whose SCG LCID is 5.

In an embodiment of this application, sorting is performed in an order of the cell groups to which the LCIDs of the three paths belong, to be specific, sorting is performed in an order of a secondary cell group LCID first and then a master cell group LCID, and sorting is performed in descending order of LCIDs in each cell group.

Figure 5:
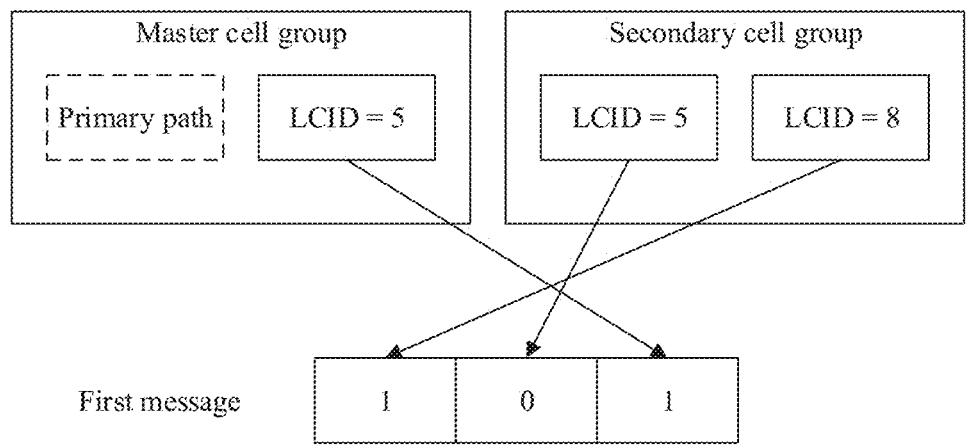
FIG. 5 is a schematic diagram in which a first message indicates initial statuses of a plurality of paths according to another embodiment of this application.

FIG. 5 is a schematic diagram in which a first message indicates initial statuses of a plurality of paths according to another embodiment of this application. As shown in FIG. 5, it is assumed that first indication information included in the first message indicates initial statuses of three paths other than a primary path. The three paths are respectively a path whose LCID value is 5 in a master cell group (MCG), a path whose LCID value is 5 in a secondary cell group (SCG), and a path whose LCID value is 8 in the secondary cell group (SCG). A plurality of bits may be sorted in an order of cell groups to which the LCIDs of the three paths belong, to be specific, sorting is performed in an order of a secondary cell group LCID first and then a master cell group LCID, and sorting is performed in descending order of LCIDs in each cell group.

For example, as shown in FIG. 5, the first bit indicates a first path, and the first path is the path whose SCG LCID is 8; the second bit indicates a second path, and the second path is the path whose SCG LCID is 5; and the third bit indicates a third path, and the third path is the path whose MCG LCID is 5.

In an embodiment of this application, sorting is performed in an order of the cell groups to which the LCIDs of the three paths belong, to be specific, sorting is performed in an order of a secondary cell group LCID first and then a master cell group LCID, and sorting is performed in ascending order of LCIDs in each cell group.

Figure 6:
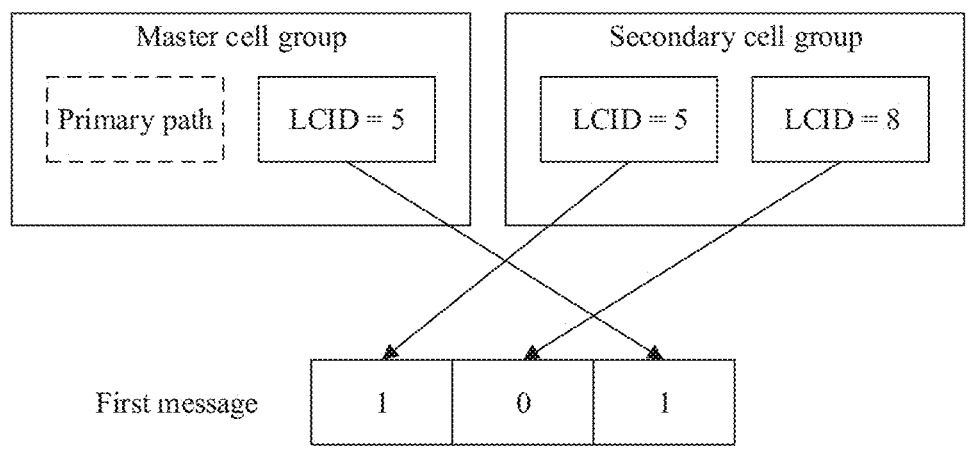
FIG. 6 is a schematic diagram in which a first message indicates initial statuses of a plurality of paths according to another embodiment of this application.

FIG. 6 is a schematic diagram in which a first message indicates initial statuses of a plurality of paths according to another embodiment of this application. As shown in FIG. 6, it is assumed that first indication information included in the first message indicates initial statuses of three paths other than a primary path. The three paths are respectively a path whose LCID value is 5 in a master cell group (MCG), a path whose LCID value is 5 in a secondary cell group (SCG), and a path whose LCID value is 8 in the secondary cell group (SCG). A plurality of bits may be sorted in an order of cell groups to which the LCIDs of the three paths belong, to be specific, sorting is performed in an order of a secondary cell group LCID first and then a master cell group LCID, and sorting is performed in ascending order of LCIDs in each cell group.

For example, as shown in FIG. 6, the first bit indicates a first path, and the first path is the path whose SCG LCID is 5; the second bit indicates a second path, and the second path is the path whose SCG LCID is 8; and the third bit indicates a third path, and the third path is the path whose MCG LCID is 5.

In an embodiment of this application, sorting is performed in descending order of the LCIDs of the three paths, and when LCIDs have a same value, sorting is performed in an order of a master cell group first and then a secondary cell group.

Figure 7:
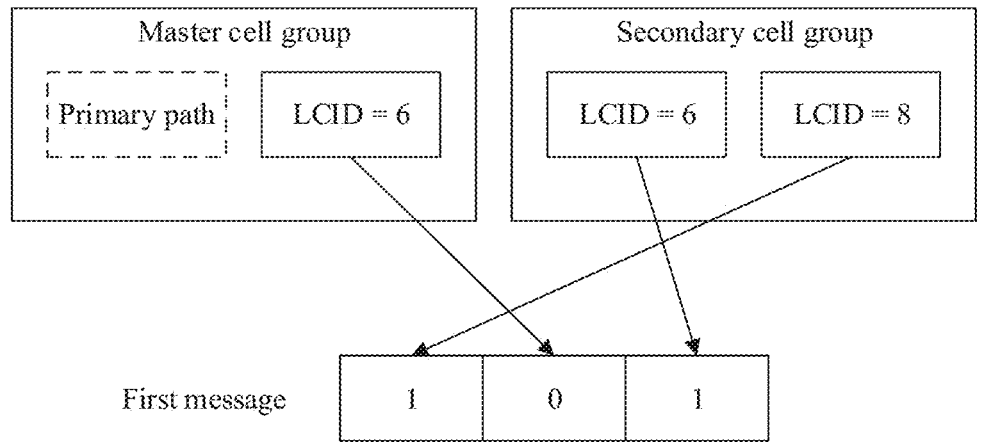
FIG. 7 is a schematic diagram in which a first message indicates initial statuses of a plurality of paths according to another embodiment of this application.

FIG. 7 is a schematic diagram in which a first message indicates initial statuses of a plurality of paths according to another embodiment of this application. As shown in FIG. 7, it is assumed that first indication information included in the first message indicates initial statuses of three paths other than a primary path. The three paths are respectively a path whose LCID value is 6 in a master cell group (MCG), a path whose LCID value is 6 in a secondary cell group (SCG), and a path whose LCID value is 8 in the secondary cell group (SCG). A plurality of bits may be sorted in descending order of the LCIDs of the three paths, and when LCIDs have a same value, sorting is performed in an order of a master cell group first and then a secondary cell group.

For example, as shown in FIG. 7, the first bit indicates a first path, and the first path is the path whose SCG LCID is 8; the second bit indicates a second path, and the second path is the path whose MCG LCID is 6; and the third bit indicates a third path, and the third path is the path whose SCG LCID is 6.

In an embodiment of this application, sorting is performed in descending order of the LCIDs of the three paths, and when LCIDs have a same value, sorting is performed in an order of a secondary cell group first and then a master cell group.

Figure 8:
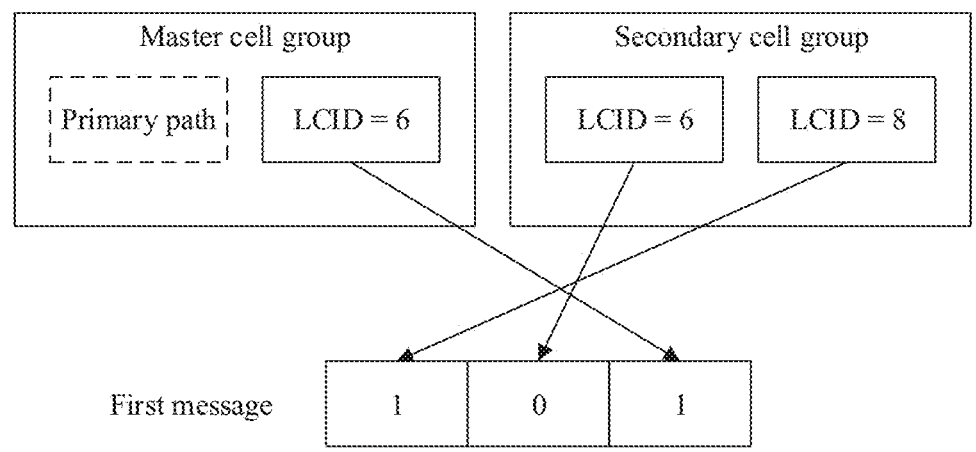
FIG. 8 is a schematic diagram in which a first message indicates initial statuses of a plurality of paths according to another embodiment of this application.

FIG. 8 is a schematic diagram in which a first message indicates initial statuses of a plurality of paths according to another embodiment of this application. As shown in FIG. 8, it is assumed that first indication information included in the first message indicates initial statuses of three paths other than a primary path. The three paths are respectively a path whose LCID value is 6 in a master cell group (MCG), a path whose LCID value is 6 in a secondary cell group (SCG), and a path whose LCID value is 8 in the secondary cell group (SCG). A plurality of bits may be sorted in descending order of the LCIDs of the three paths, and when LCIDs have a same value, sorting is performed in an order of a secondary cell group first and then a master cell group.

For example, as shown in FIG. 8, the first bit indicates a first path, and the first path is the path whose SCG LCID is 8; the second bit indicates a second path, and the second path is the path whose SCG LCID is 6; and the third bit indicates a third path, and the third path is the path whose MCG LCID is 6.

In an embodiment of this application, sorting is performed in ascending order of the LCIDs of the three paths, and when LCIDs have a same value, sorting is performed in an order of a master cell group first and then a secondary cell group.

Figure 9:
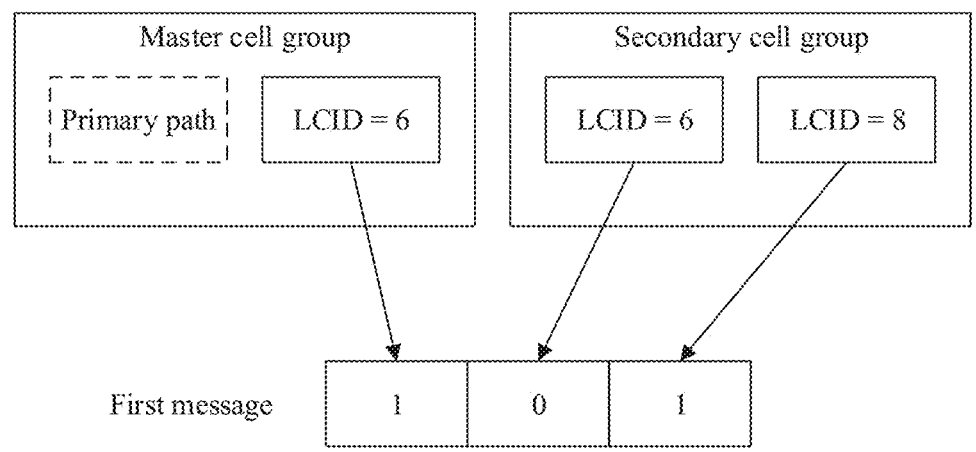
FIG. 9 is a schematic diagram in which a first message indicates initial statuses of a plurality of paths according to another embodiment of this application.

FIG. 9 is a schematic diagram in which a first message indicates initial statuses of a plurality of paths according to another embodiment of this application. As shown in FIG. 9, it is assumed that first indication information included in the first message indicates initial statuses of three paths other than a primary path. The three paths are respectively a path whose LCID value is 6 in a master cell group (MCG), a path whose LCID value is 6 in a secondary cell group (SCG), and a path whose LCID value is 8 in the secondary cell group (SCG). A plurality of bits may be sorted in ascending order of the LCIDs of the three paths, and when LCIDs have a same value, sorting is performed in an order of a master cell group first and then a secondary cell group.

For example, as shown in FIG. 9, the first bit indicates a first path, and the first path is the path whose MCG LCID is 6; the second bit indicates a second path, and the second path is the path whose SCG LCID is 6; and the third bit indicates a third path, and the third path is the path whose SCG LCID is 8.

In an embodiment of this application, sorting is performed in ascending order of the LCIDs of the three paths, and when LCIDs have a same value, sorting is performed in an order of a secondary cell group first and then a master cell group.

Figure 10:
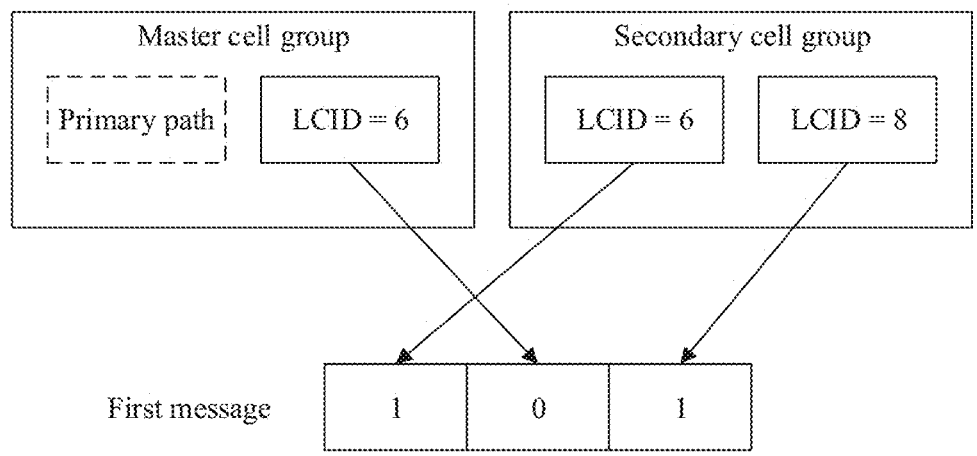
FIG. 10 is a schematic diagram in which a first message indicates initial statuses of a plurality of paths according to another embodiment of this application.

FIG. 10 is a schematic diagram in which a first message indicates initial statuses of a plurality of paths according to another embodiment of this application. As shown in FIG. 10, it is assumed that first indication information included in the first message indicates initial statuses of three paths other than a primary path. The three paths are respectively a path whose LCID value is 6 in a master cell group (MCG), a path whose LCID value is 6 in a secondary cell group (SCG), and a path whose LCID value is 8 in the secondary cell group (SCG). A plurality of bits may be sorted in ascending order of the LCIDs of the three paths, and when LCIDs have a same value, sorting is performed in an order of a secondary cell group first and then a master cell group.

For example, as shown in FIG. 10, the first bit indicates a first path, and the first path is the path whose SCG LCID is 6; the second bit indicates a second path, and the second path is the path whose MCG LCID is 6; and the third bit indicates a third path, and the third path is the path whose SCG LCID is 8.

It should be noted that the value of the first indication information herein is used to indicate the initial status of the bearer configuration of the first device. For example, when the value of the first indication information indicates that the bearer configuration of the first device is the first bearer configuration, the first bearer configuration may be a duplication configuration, and an initial status of the first bearer configuration includes an activated state and a deactivated state. The foregoing is used as an example for description, and no special limitation is imposed thereto.

In an embodiment of this application, when the bearer of the first device includes N paths, the initial status of the first bearer configuration may include initial statuses of the N paths. The initial status of each path is an activated state or a deactivated state, and the value of the first indication information may be N bits or ranges from 0 to $2^{(N-1)}$, and is used to indicate the initial statuses of the N paths, where N is a positive integer greater than 1.

For example, when the bearer of the first device includes three paths, three bits may be used to indicate that the bearer of the first device includes initial statuses of the three paths, in other words, the three bits are used to indicate the initial statuses of the three paths included in the bearer of the first device.

Optionally, in an embodiment of this application, the bearer of the first device includes three paths, the three paths include one primary path, and the primary path is always in a working state. Therefore, the primary path is in an activated state, in other words, a bit indicating the primary path is always "1".

Optionally, in an embodiment of this application, the bearer of the first device includes three paths, and the three paths include one primary path. An initial status of the primary path can be indicated. The primary path may be in a deactivated state, in other words, a bit indicating the primary path may be "0".

When the value of the first indication information is three bits, the three bits respectively indicate initial statuses of the first path, the second path, and the third path other than the primary path.

For example, "111" may be used to indicate that the three paths each are in an activated state; "110" may be used to indicate that the first path and the second path are in an activated state, and the third path is in a deactivated state; "101" may be used to indicate that the first path and the third path are in an activated state, and the second path is in a deactivated state; "100" may be used to indicate that the first path is in an activated state, and the second path and the third path are in a deactivated state; "011" may be used to indicate that the first path is in a deactivated state, and the second path and the third path are in an activated state; "010" may be used to indicate that the first path and the third path are in a deactivated state, and the second path is in an activated state; "001" may be used to indicate that the first path and the second path are in a deactivated state, and the third path is in an activated state; and "000" may be used to indicate that the three paths each are in a deactivated state. It should be understood that, alternatively, "0" may indicate "activated state" and "1" may indicate "deactivated state" herein. This is not limited in this application.

A sequence of the indicated first path, second path, and third path, that is, a correspondence between three bits and the configured paths may be:

sorting is performed in descending order of logical channel identifiers LCIDs of the three paths; or sorting is performed in ascending order of LCIDs of the three paths; or sorting is performed in an order of configuring LCIDs of the three paths; or sorting is performed in an order of cell groups to which LCIDs of the three paths belong, to be specific, sorting is performed in an order of a master cell group LCID first and then a secondary cell group LCID, and sorting is performed in ascending or descending order of LCIDs in each cell group; or sorting is performed in an order of cell groups to which LCIDs of the three paths belong, to be specific, sorting is performed in an order of a secondary cell group LCID first and then a master cell group LCID, and sorting is performed in ascending or descending order of LCIDs in each cell group; or sorting is performed in descending order of LCIDs of the three paths, and when LCIDs have a same value, sorting is performed in an order of a master cell group first and then a secondary cell group, or sorting is performed in an order of a secondary cell group first and then a master cell group; or sorting is performed in ascending order of LCIDs of the three paths, and when LCIDs have a same value, sorting is performed in an order of a master cell group first and then a secondary cell group, or sorting is performed in an order of a secondary cell group first and then a master cell group LCID.

In an embodiment of this application, sorting is performed in descending order of logical channel identifiers LCIDs of the three paths.

For example, it is assumed that LCID values of the three paths are 5, 7, and 8. In this case, the first path is the path whose LCID is 8, the second path is the path whose LCID is 7, and the second path is the path whose LCID is 5.

In an embodiment of this application, sorting is performed in ascending order of logical channel identifiers LCIDs of the three paths.

For example, it is assumed that the first indication information indicates initial statuses of the three paths, and LCID values of the three paths are 5, 7, and 8. In this case, the first path is the path whose LCID is 5, the second path is the path whose LCID is 7, and the second path is the path whose LCID is 8.

In an embodiment of this application, sorting is performed in an order of cell groups to which LCIDs of the three paths belong, to be specific, sorting is performed in an order of a master cell group LCID first and then a secondary cell group LCID, and sorting is performed in ascending order of LCIDs in each cell group.

For example, it is assumed that the first indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose MCG LCID is 5, the second path is the path whose SCG LCID is 5, and the third path is the path whose SCG LCID is 8.

In an embodiment of this application, sorting is performed in an order of cell groups to which LCIDs of the three paths belong, to be specific, sorting is performed in an order of a master cell group LCID first and then a secondary cell group LCID, and sorting is performed in descending order of LCIDs in each cell group.

For example, it is assumed that the first indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose MCG LCID is 5, the second path is the path whose SCG LCID is 8, and the third path is the path whose SCG LCID is 5.

In an embodiment of this application, sorting is performed in an order of cell groups to which LCIDs of the three paths belong, to be specific, sorting is performed in an order of a secondary cell group LCID first and then a master cell group LCID, and sorting is performed in descending order of LCIDs in each cell group.

For example, it is assumed that the first indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose SCG LCID is 8, the second path is the path whose SCG LCID is 5, and the third path is the path whose MCG LCID is 5.

In an embodiment of this application, sorting is performed in an order of cell groups to which LCIDs of the three paths belong, to be specific, sorting is performed in an order of a secondary cell group LCID first and then a master cell group LCID, and sorting is performed in ascending order of LCIDs in each cell group.

For example, it is assumed that the first indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose SCG LCID is 5, the second path is the path whose SCG LCID is 8, and the third path is the path whose MCG LCID is 5.

In an embodiment of this application, sorting is performed in descending order of LCIDs of the three paths, and when LCIDs have a same value, sorting is performed in an order of a master cell group first and then a secondary cell group.

For example, it is assumed that the first indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose SCG LCID is 8, the second path is the path whose MCG LCID is 5, and the third path is the path whose SCG LCID is 5.

In an embodiment of this application, sorting is performed in descending order of LCIDs of the three paths, and when LCIDs have a same value, sorting is performed in an order of a secondary cell group first and then a master cell group.

For example, it is assumed that the first indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose SCG LCID is 8, the second path is the path whose SCG LCID is 5, and the third path is the path whose MCG LCID is 5.

In an embodiment of this application, sorting is performed in ascending order of LCIDs of the three paths, and when LCIDs have a same value, sorting is performed in an order of a master cell group first and then a secondary cell group.

For example, it is assumed that the first indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose MCG LCID is 5, the second path is the path whose SCG LCID is 5, and the third path is the path whose SCG LCID is 8.

In an embodiment of this application, sorting is performed in ascending order of LCIDs of the three paths, and when LCIDs have a same value, sorting is performed in an order of a secondary cell group first and then a master cell group.

For example, it is assumed that the first indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose SCG LCID is 5, the second path is the path whose MCG LCID is 5, and the third path is the path whose SCG LCID is 8.

In an embodiment of this application, sorting is performed in an order of configuring LCIDs of the three paths.

For example, it is assumed that the first indication information indicates initial statuses of the three paths, LCID values of the three paths are 5, 7, and 8, and a configuration order is 8, 7, and 5. In this case, the first path is the path whose LCID is 8, the second path is the path whose LCID is 7, and the second path is the path whose LCID is 5.

In an embodiment of this application, sorting is performed in an order of configuring LCIDs of the three paths.

For example, it is assumed that the first indication information indicates initial statuses of the three paths, LCID values of the three paths are 5, 7, and 8, and a primary path is a path whose LCID is 7. In this case, the primary path may be specified as a first path, that is, the most significant bit of a bit string, in other words, the first path is the path whose LCID is 7. Alternatively, the primary path is specified as a third path, that is, the least significant bit of a bit string, in other words, the third path is the path whose LCID is 7. The remaining two paths are sorted in a specific order, for example, in an order of LCID values or in an order of cell groups. This is similar to another sorting method mentioned in this embodiment. Details are not described herein again.

It should be noted that the value of the first indication information herein is used to indicate the initial status of the bearer configuration of the first device. For example, when the value of the first indication information indicates that the bearer configuration of the first device is the first bearer configuration, the first bearer configuration may be a duplication configuration, and an initial status of the first bearer configuration includes an activated state and a deactivated state. The foregoing is used as an example for description, and no special limitation is imposed thereto.

In an embodiment of this application, when the bearer of the first device includes N paths, the initial status of the first bearer configuration may include initial statuses of N−1 paths in the N paths other than a primary path. The initial statuses of the N−1 paths include an activated state or a deactivated state, the value of the first indication information may be M bits or ranges from 0 to $2^{(M-1)}$, and each of the M bits or each of M bits obtained after binary conversion is used to indicate that an initial status of each of at least one of the N−1 paths is the activated state or the deactivated state, where N is greater than M, and both N and M are positive integers greater than 1.

In this embodiment of this application, when the value of the first indication information is a plurality of bits or is a plurality of bits obtained after binary conversion, the plurality of bits are sorted in descending order of logical channel identifiers LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a master cell group LCID first and then a secondary cell group LCID, and sorting is performed in descending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in descending order of LCIDs of a plurality of paths in each cell group; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

For example, when the value of the first indication information is three bits, the three bits respectively indicate initial statuses of the first path, the second path, and the third path other than the primary path. It should be understood that the first path, the second path, and the third path include at least one path.

For example, "111" may be used to indicate that the three paths each are in an activated state; "110" may be used to indicate that the first path and the second path are in an activated state, and the third path is in a deactivated state; "101" may be used to indicate that the first path and the third path are in an activated state, and the second path is in a deactivated state; "100" may be used to indicate that the first path is in an activated state, and the second path and the third path are in a deactivated state; "011" may be used to indicate that the first path is in a deactivated state, and the second path and the third path are in an activated state; "010" may be used to indicate that the first path and the third path are in a deactivated state, and the second path is in an activated state; "001" may be used to indicate that the first path and the second path are in a deactivated state, and the third path is in an activated state; and "000" may be used to indicate that the three paths each are in a deactivated state. It should be understood that, alternatively, "0" may indicate "activated state" and "1" may indicate "deactivated state" herein. This is not limited in this application.

For example, five paths are configured, three bits are used to indicate initial statuses of the first path, the second path, and the third path other than the primary path. In other words, the three bits are used to indicate initial statuses of four configured paths.

Optionally, in an embodiment of this application, correspondences of the first path, the second path, and the third path are determined based on grouping statuses of the four configured paths other than the primary path and corresponding LCIDs. A sorting method may be the same as the sorting method in the foregoing embodiment. Details are not described herein again.

Optionally, in an embodiment of this application, a quantity of bits of the first indication information corresponds to a quantity of cell groups, and each bit indicates an initial status of a path in a corresponding cell group. For example, when the first information includes two bits, the first bit corresponds to all paths in an MCG, and the second bit corresponds to all paths in an SCG. For another example, when there are more than two cell groups, for example, when there are four cell groups, the first information includes four bits, the first bit corresponds to all paths in an MCG, and correspondences of the last three bits and the three SCGs are determined based on sorting of the SCGs.

Optionally, in an embodiment of this application, a quantity of bits of the first indication information corresponds to a quantity of cell groups, and each bit indicates an initial status of a path in a corresponding cell group other than a primary path. For example, when the first information includes two bits, the first bit corresponds to all paths in an MCG, and the second bit corresponds to all paths in an SCG.

Figure 11:
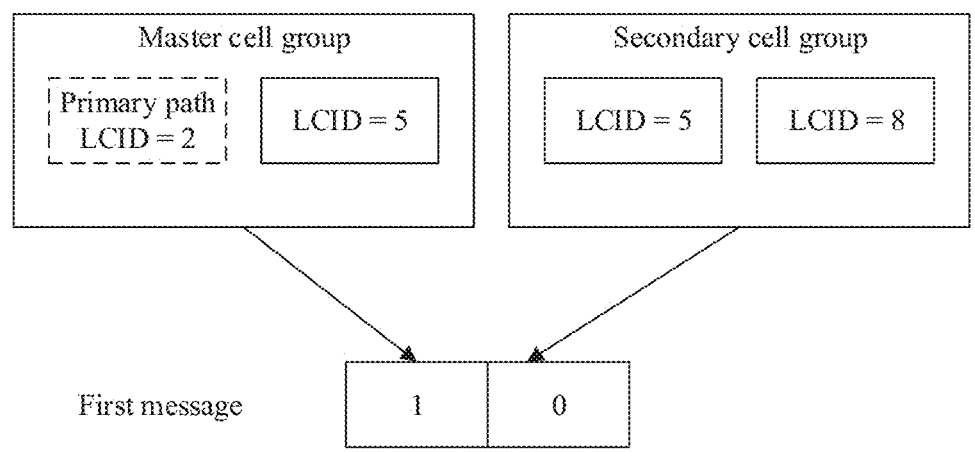
FIG. 11 is a schematic diagram in which a first message indicates initial statuses of a plurality of paths according to another embodiment of this application.

FIG. 11 is a schematic diagram in which a first message indicates initial statuses of a plurality of paths other than a primary path according to another embodiment of this application. As shown in FIG. 11, it is assumed that first indication information included in the first message includes two bits. The first bit is used to indicate initial statuses of all paths in a master cell group, for example, an initial status of a path whose LCID value is 5. The second bit indicates initial statuses of all paths in a secondary cell group, for example, an initial status of a path whose LCID value is 5 and an initial status of a path whose LCID value is 8 in the secondary cell group.

Optionally, in an embodiment of this application, when there are more than two cell groups, for example, when there are four cell groups, the first information includes four bits, the first bit corresponds to all paths in an MCG other than the primary path, and correspondences of the last three bits and the three SCGs are determined based on sorting of the SCGs. It should be understood that the primary path may alternatively be a path in the SCG.

Figure 12:
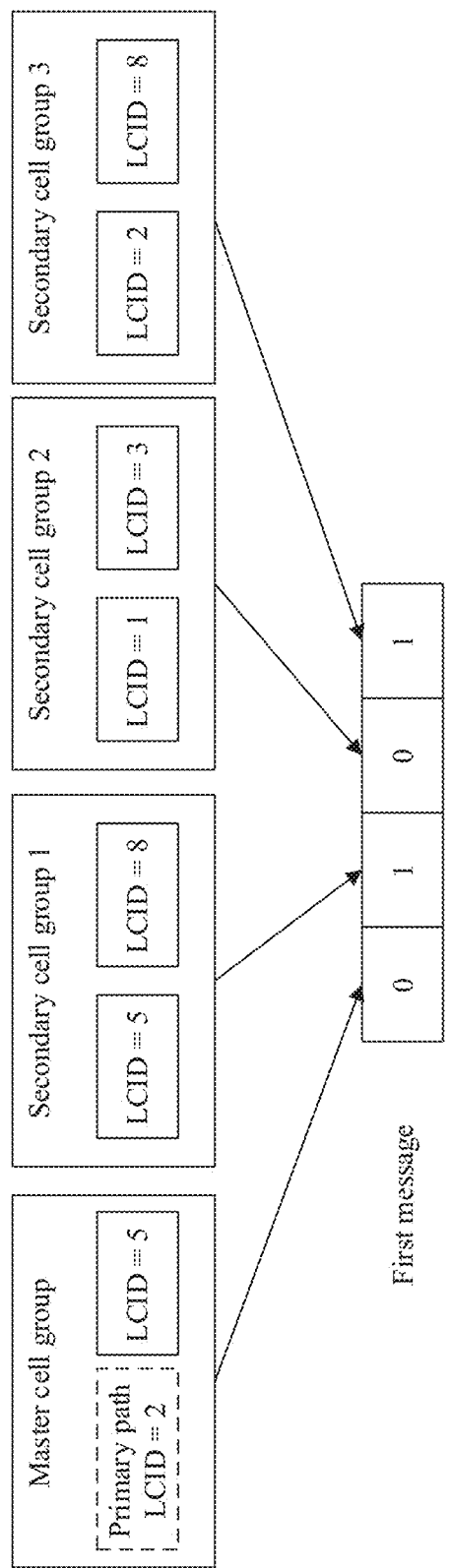
FIG. 12 is a schematic diagram in which a first message indicates initial statuses of a plurality of paths according to another embodiment of this application.

FIG. 12 is a schematic diagram in which a first message indicates initial statuses of a plurality of paths other than a primary path according to another embodiment of this application. As shown in FIG. 12, it is assumed that first indication information included in the first message includes four bits used to indicate initial statuses of paths in four cell groups. The paths include: a path whose LCID value is 5 in a master cell group; a path whose LCID value is 5 and a path whose LCID value is 8 in a secondary cell group 1; a path whose LCID value is 1 and a path whose LCID value is 3 in a secondary cell group 2; and a path whose LCID value is 2 and a path whose LCID value is 8 in a secondary cell group 3. The first bit in the first indication information is used to indicate initial statuses of all paths in the master cell group, the second bit in the first indication information is used to indicate initial statuses of all paths in the secondary cell group 1, the third bit in the first indication information is used to indicate initial statuses of all paths in the secondary cell group 2, and the fourth bit in the first indication information is used to indicate initial statuses of all paths in the secondary cell group 3.

Optionally, in an embodiment of this application, if a quantity of bits of the first indication information is 1, the one bit corresponds to initial statuses of all paths other than the primary path.

Figure 13:
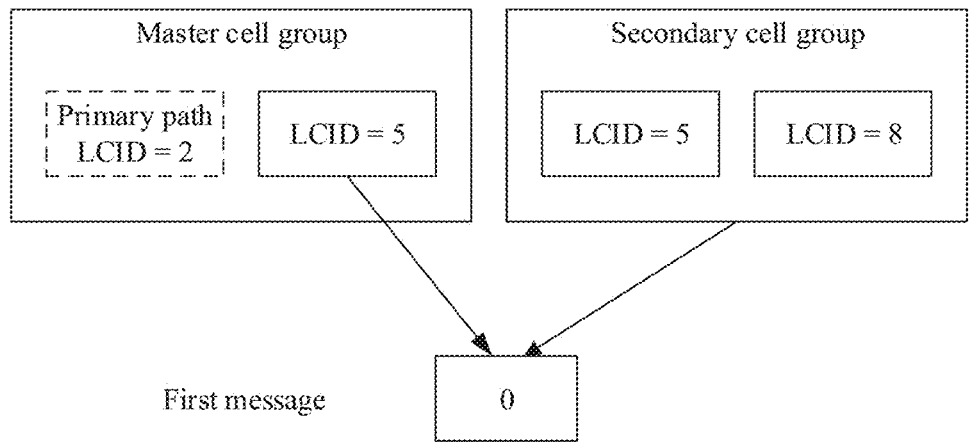
FIG. 13 is a schematic diagram in which a first message indicates initial statuses of a plurality of paths according to another embodiment of this application.

FIG. 13 is a schematic diagram in which a first message indicates initial statuses of a plurality of paths other than a primary path according to another embodiment of this application. As shown in FIG. 13, it is assumed that first indication information included in the first message indicates initial statuses of three paths other than the primary path. The three paths are respectively a path whose LCID value is 5 in a master cell group (MCG), a path whose LCID value is 5 in a secondary cell group (SCG), and a path whose LCID value is 8 in the secondary cell group (SCG). One bit in the first indication information is used to indicate initial statuses of all paths other than the primary path.

Optionally, in an embodiment of this application, initial statuses of paths included in different cell groups are the same, and the one bit is used to indicate initial statuses of all paths in a cell group.

Figure 14:
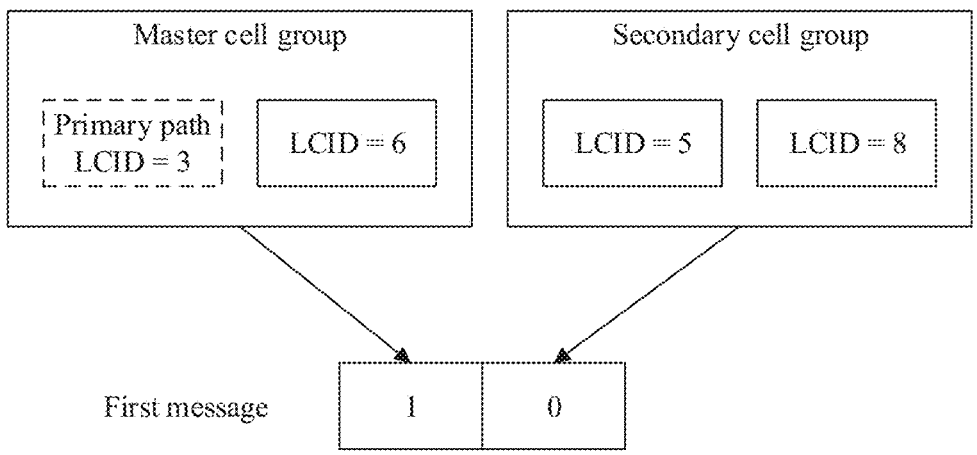
FIG. 14 is a schematic diagram in which a first message indicates initial statuses of a plurality of paths according to another embodiment of this application.

FIG. 14 is a schematic diagram in which a first message indicates initial statuses of a plurality of paths other than a primary path according to another embodiment of this application. As shown in FIG. 14, the first bit in the first indication information included in the first message indicates initial statuses of all paths in a master cell group, and the master cell group includes a path whose LCID value is 6. The second bit in the first indication information indicates initial statuses of all paths in a secondary cell group, and the secondary cell group includes a path whose LCID value is 5 and a path whose LCID value is 8.

Optionally, in an embodiment of this application, the initial statuses of all paths including the primary path in the cell group each are always an activated state.

It should be noted that the value of the first indication information herein is used to indicate the initial status of the bearer configuration of the first device. For example, when the value of the first indication information indicates that the bearer configuration of the first device is the first bearer configuration, the first bearer configuration may be a duplication configuration, and an initial status of the first bearer configuration includes an activated state and a deactivated state. The foregoing is used as an example for description, and no special limitation is imposed thereto.

In an embodiment of this application, when the bearer of the first device includes N paths, the initial status of the first bearer configuration may include initial statuses of the N paths. The initial status of each path is an activated state or a deactivated state. The value of the first indication information is M bits or ranges from 0 to $2^{(M-1)}$, and each of the M bits or each of M bits obtained after binary conversion is used to indicate that an initial status of each of at least one of the N paths is the activated state or the deactivated state, where N is greater than M, and both N and M are positive integers greater than 1.

In this embodiment of this application, when the value of the first indication information is a plurality of bits or is a plurality of bits obtained after binary conversion, the plurality of bits are sorted in descending order of logical channel identifiers LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a master cell group LCID first and then a secondary cell group LCID, and sorting is performed in descending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in descending order of LCIDs of a plurality of paths in each cell group; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

For example, when the value of the first indication information is three bits, the three bits respectively indicate initial statuses of the first path, the second path, and the third path. It should be understood that the first path, the second path, and the third path include at least one path.

For example, "111" may be used to indicate that the three paths each are in an activated state; "110" may be used to indicate that the first path and the second path are in an activated state, and the third path is in a deactivated state; "101" may be used to indicate that the first path and the third path are in an activated state, and the second path is in a deactivated state; "100" may be used to indicate that the first path is in an activated state, and the second path and the third path are in a deactivated state; "011" may be used to indicate that the first path is in a deactivated state, and the second path and the third path are in an activated state; "010" may be used to indicate that the first path and the third path are in a deactivated state, and the second path is in an activated state; "001" may be used to indicate that the first path and the second path are in a deactivated state, and the third path is in an activated state; and "000" may be used to indicate that the three paths each are in a deactivated state. It should be understood that, alternatively, "0" may indicate "activated state" and "1" may indicate "deactivated state" herein. This is not limited in this application.

For example, there are five configured paths, and three bits are used to indicate the first path, the second path, and the third path, in other words, the three bits are used to indicate initial statuses of the five configured paths.

It should be understood that, when the three bits are used to indicate the initial statuses of the five paths, the first path may be considered as a first path group including at least one path, and one of the three bits is used to indicate an initial status of the at least one path.

Optionally, in an embodiment of this application, one bit in the first indication information is used to indicate an initial status of the primary path, and another bit is used to indicate a remaining path.

Figure 15:
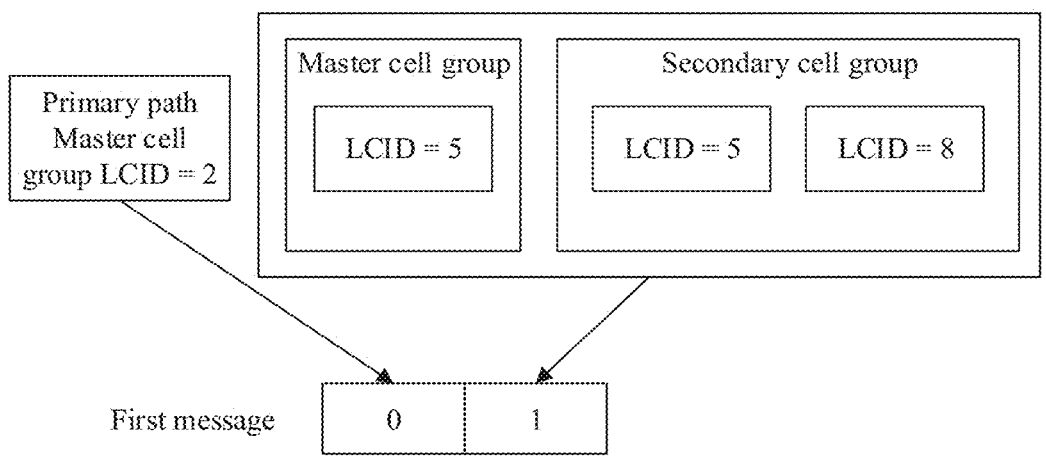
FIG. 15 is a schematic diagram in which a first message indicates initial statuses of a plurality of paths according to another embodiment of this application.

FIG. 15 is a schematic diagram in which a first message indicates initial statuses of a plurality of paths according to another embodiment of this application. As shown in FIG. 13, the first bit in first indication information included in the first message indicates an initial status of a primary path, and the second bit in the first indication information indicates initial statuses of all paths in a master cell group and a secondary cell group. The master cell group includes a path whose LCID value is 5, and the secondary cell group includes a path whose LCID value is 5 and a path whose LCID value is 8.

Figure 16:
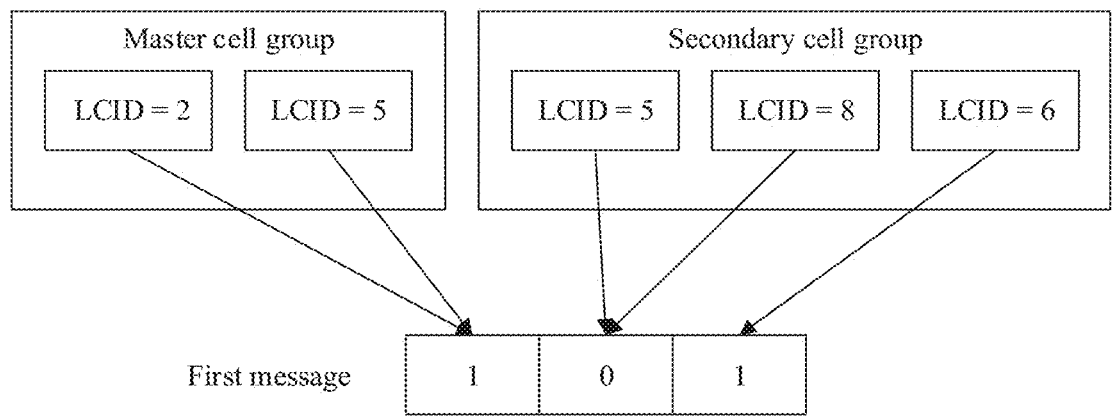
FIG. 16 is a schematic diagram in which a first message indicates initial statuses of a plurality of paths according to another embodiment of this application.

FIG. 16 is a schematic diagram in which a first message indicates initial statuses of a plurality of paths according to another embodiment of this application. As shown in FIG. 16, first indication information included in the first message indicates initial statuses of the plurality of paths. The five paths are respectively a path whose LCID value is 2 and a path whose LCID value is 5 in a master cell group (MCG), and a path whose LCID value is 5, a path whose LCID value is 8, and a path whose LCID value is 6 in a secondary cell group (SCG). Three bits of the first indication information are used to indicate the initial statuses of the five paths. For example, the first bit in the three bits indicates a first path, and the first path may be the two paths in the master cell: the path whose LCID value is 2 and the path whose LCID value is 5. The second bit indicates a second path, and the second path may be two paths in the secondary cell group: the path whose LCID value is 5 and the path whose LCID value is 8. The third bit indicates a third path, the third path may be one path in the secondary cell group: the path whose LCID value is 6. It should be understood that an example is used above for description, and does not limit this application.

Optionally, in an embodiment of this application, a quantity of bits of the first indication information corresponds to a quantity of cell groups, and each bit indicates an initial status of a path in a corresponding cell group. For example, when the first information includes two bits, the first bit corresponds to all paths in an MCG, and the second bit corresponds to all paths in an SCG. For another example, when there are more than two cell groups, for example, when there are four cell groups, the first information includes four bits, the first bit corresponds to all paths in an MCG, and correspondences of the last three bits and the three SCGs are determined based on sorting of the SCGs.

Optionally, in an embodiment of this application, a quantity of bits of the first indication information corresponds to a quantity of cell groups, and each bit indicates an initial status of a path in a corresponding cell group. For example, when the first information includes two bits, the first bit corresponds to all paths in an MCG, and the second bit corresponds to all paths in an SCG.

Figure 17:
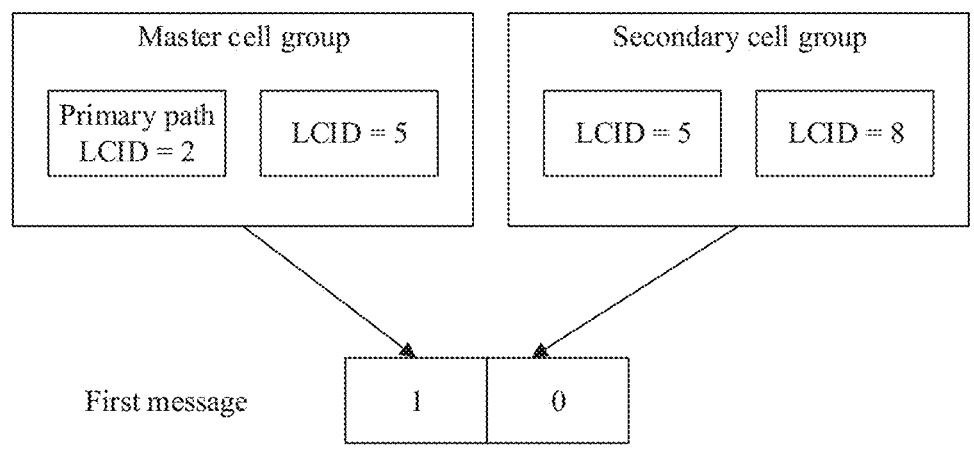
FIG. 17 is a schematic diagram in which a first message indicates initial statuses of a plurality of paths according to another embodiment of this application.

FIG. 17 is a schematic diagram in which a first message indicates initial statuses of a plurality of paths according to another embodiment of this application. As shown in FIG. 17, it is assumed that first indication information included in the first message includes two bits. The first bit is used to indicate all paths in a master cell group, for example, an initial status of a primary path whose LCID value is 2 and an initial status of a path whose LCID value is 5. The second bit indicates all paths in a secondary cell group, for example, an initial status of a path whose LCID value is 5 and a path whose LCID value is 8 in a secondary cell group.

Optionally, in an embodiment of this application, when there are more than two cell groups, for example, when there are four cell groups, the first information includes four bits, the first bit corresponds to all paths in an MCG, and correspondences of the last three bits and the three SCGs are determined based on sorting of the SCGs.

Figure 18:
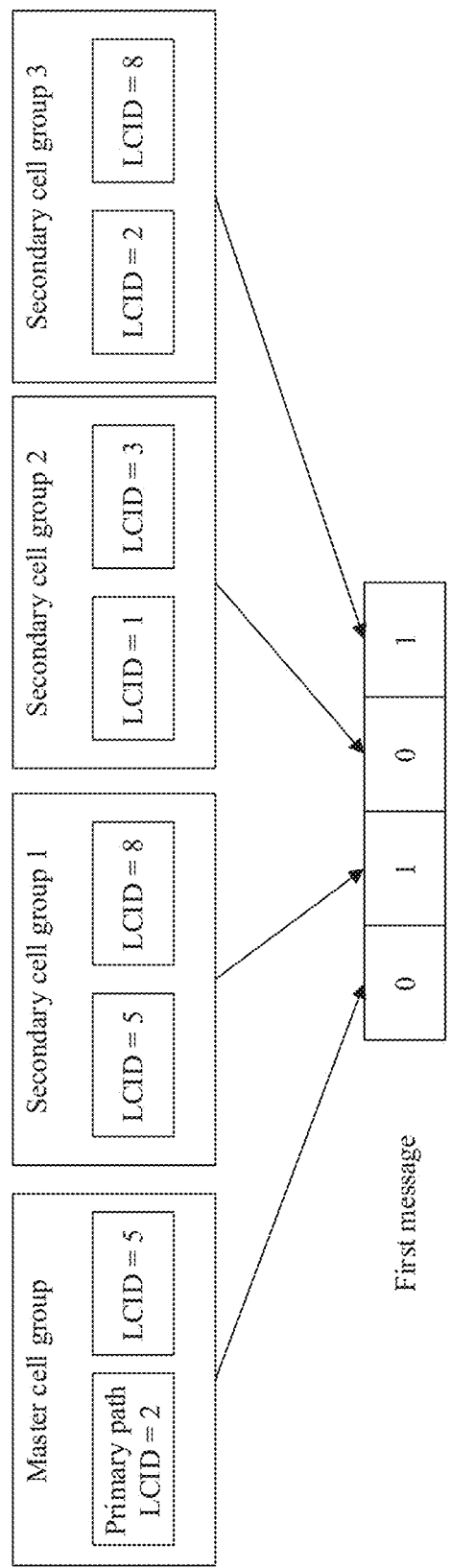
FIG. 18 is a schematic diagram in which a first message indicates initial statuses of a plurality of paths according to another embodiment of this application.

FIG. 18 is a schematic diagram in which a first message indicates initial statuses of a plurality of paths according to another embodiment of this application. As shown in FIG. 18, it is assumed that first indication information included in the first message includes four bits used to indicate initial statuses of paths in four cell groups. The paths include: a primary path whose LCID value is 2 and a path whose LCID value is 5 in a master cell group; a path whose LCID value is 5 and a path whose LCID value is 8 in a secondary cell group 1; a path whose LCID value is 1 and a path whose LCID value is 3 in a secondary cell group 2; and a path whose LCID value is 2 and a path whose LCID value is 8 in a secondary cell group 3. The first bit in the first indication information is used to indicate initial statuses of all the paths in the master cell group. The second bit in the first indication information is used to indicate initial statuses of all the paths in the secondary cell group 1. The third bit in the first indication information is used to indicate initial statuses of all the paths in the secondary cell group 2. The fourth bit in the first indication information is used to indicate initial statuses of all the paths in the secondary cell group 3.

Optionally, in an embodiment of this application, the initial statuses of all the paths in the cell group each are always in an activated state.

Optionally, in an embodiment of this application, correspondences of the first path, the second path, and the third path are determined based on grouping statuses of the five configured paths and corresponding LCIDs. A sorting method may be the same as the sorting method in the foregoing embodiment. Details are not described herein again.

Optionally, in an embodiment of this application, a quantity of bits of the first indication information corresponds to a quantity of cell groups, and each bit indicates an initial status of a path in a corresponding cell group. For example, when the first information includes two bits, the first bit corresponds to all paths in an MCG, and the second bit corresponds to all paths in an SCG. For another example, when there are more than two cell groups, for example, when there are four cell groups, the first information includes four bits, the first bit corresponds to all paths in an MCG, and correspondences of the last three bits and the three SCGs are determined based on sorting of the SCGs.

It should be noted that the value of the first indication information herein is used to indicate the initial status of the bearer configuration of the first device. For example, when the value of the first indication information indicates that the bearer configuration of the first device is the first bearer configuration, the first bearer configuration may be a duplication configuration, and an initial status of the first bearer configuration includes an activated state and a deactivated state. The foregoing is used as an example for description, and no special limitation is imposed thereto.

The foregoing provides detailed descriptions: The first message includes the first indication information, and the value of the first indication information is used to indicate the initial status of the bearer configuration of the first device. It should be understood that an example is used above for description, and no limitation is imposed on this embodiment of this application.

Manner 2

In this embodiment of this application, the first message may include second indication information. The second indication information is used to indicate the bearer configuration of the first device. In other words, the second indication information is used to indicate the bearer configuration of the bearer of the first device. The bearer configuration includes the first bearer configuration and/or the second bearer configuration.

The first message further includes third indication information. The third indication information is used to indicate the initial status of the bearer of the first device. The initial status includes at least an activated state and a deactivated state.

For example, the first message includes the following second indication information, to indicate the bearer configuration of the first device. A first bearer may be a bearer configured with duplication, and a second bearer may be a split bearer.

Split bearer (the first message includes the second indication information, and if the second indication information includes this field and the field is set, it indicates that the bearer of the first device is the bearer configured with duplication; or if the second indication information includes this field but the field is not set, it indicates that the bearer of the first device is a split bearer), which is used as an example for description herein and is not particularly limited.

The first message further includes the third indication information, and the third indication information is used to indicate the initial status of the bearer of the first device.

For example, the first message may include the following third indication information.

pdcp-Duplication: When the first message includes this field, a value of the field is used to indicate the initial status of the bearer of the first device, and the initial status includes at least an activated state and a deactivated state.

For example, when the value of the field is "1", it indicates that the initial status of the bearer of the first device is an activated state; or when the value of the field is "0", it indicates that the initial status of the bearer of the first device is a deactivated state. It should be understood that an example is used herein for description, and no special limitation is imposed thereto.

When the bearer of the first device includes two paths, the value of the third indication information may indicate an initial status of the first bearer by using two bits, in other words, the two bits are used to indicate an activated state and a deactivated state of the bearer configured with duplication in the first device.

For example, "11" may be used to indicate that the two paths each are in an activated state; "10" may be used to indicate that a first path is in an activated state, and a second path is in a deactivated state; "01" may be used to indicate that the first path is in a deactivated state, and the second path is in an activated state; and "00" may be used to indicate that the two paths each are in a deactivated state. It should be noted that different paths have different logical channel identifiers (Logical Channel Identify, LCID), and the different paths are distinguished based on the LCIDs.

In this embodiment of this application, when the bearer of the first device includes N paths, the initial status of the first bearer configuration may include initial statuses of N−1 paths in the N paths other than a primary path. The initial statuses of the N−1 paths each are an activated state or a deactivated state, the value of the third indication information may be one bit or ranges from 0 to 1, and the one bit is used to indicate the initial statuses of the N−1 paths, where N is a positive integer greater than 1.

For example, when the bearer of the first device includes three paths, one bit may be used to indicate the initial status of the first bearer, in other words, one bit is used to indicate an activated state and a deactivated state of the bearer configured with duplication in the first device.

For example, "1" may be used to indicate that the three paths each are in an activated state, and "0" may be used to indicate that the three paths each are in a deactivated state. An activated state of the bearer configured with duplication means that same PDUs are transmitted on the three paths. A deactivated state of the bearer configured with duplication means that only a primary path is in a working state.

In an embodiment of this application, when the bearer of the first device includes N paths, the initial status of the first bearer configuration includes initial statuses of N−1 paths in the N paths other than a primary path. The initial statuses of the N−1 paths include an activated state or a deactivated state, the value of the third indication information may be N−1 bits or ranges from 0 to $2^{(N-1)}-1$, and the N−1 bits are used to indicate the initial statuses of the N−1 paths, where N is a positive integer greater than 1.

It should be understood that the primary path is always in a working state. Therefore, when the bearer of the first device includes the N paths, only the initial statuses of the N−1 paths other than the primary path need to be determined, and the initial statuses of the N−1 paths include an activated state and a deactivated state. If any one of the N−1 paths is in an activated state, it indicates that same PDUs are transmitted on the path and the primary path.

For example, when the bearer of the first device includes four paths, three bits may be used to indicate initial statuses of three paths in the first bearer other than a primary path, in other words, the three bits are used to indicate an activated state and a deactivated state of a bearer configured with duplication is configured for the initial statuses of the three paths of the first device other than the primary path, and the three bits do not indicate an initial status of the primary path.

When the value of the third indication information is three bits, the three bits respectively indicate initial statuses of a first path, a second path, and a third path other than the primary path.

For example, "111" may be used to indicate that the three paths each are in an activated state; "110" may be used to indicate that the first path and the second path are in an activated state, and the third path is in a deactivated state; "101" may be used to indicate that the first path and the third path are in an activated state, and the second path is in a deactivated state; "100" may be used to indicate that the first path is in an activated state, and the second path and the third path are in a deactivated state; "011" may be used to indicate that the first path is in a deactivated state, and the second path and the third path are in an activated state; "010" may be used to indicate that the first path and the third path are in a deactivated state, and the second path is in an activated state; "001" may be used to indicate that the first path and the second path are in a deactivated state, and the third path is in an activated state; and "000" may be used to indicate that the three paths each are in a deactivated state. It should be understood that, alternatively, "0" may indicate "activated state" and "1" may indicate "deactivated state" herein. This is not limited in this application.

A sequence of the indicated first path, second path, and third path, that is, a correspondence between three bits and the configured paths may be:

sorting is performed in descending order of logical channel identifiers LCIDs of the three paths; or sorting is performed in ascending order of LCIDs of the three paths; or sorting is performed in an order of configuring LCIDs of the three paths; or sorting is performed in an order of cell groups to which LCIDs of the three paths belong, to be specific, sorting is performed in an order of a master cell group LCID first and then a secondary cell group LCID, and sorting is performed in ascending or descending order of LCIDs in each cell group; or sorting is performed in an order of cell groups to which LCIDs of the three paths belong, to be specific, sorting is performed in an order of a secondary cell group LCID first and then a master cell group LCID, and sorting is performed in ascending or descending order of LCIDs in each cell group; or sorting is performed in descending order of LCIDs of the three paths, and when LCIDs have a same value, sorting is performed in an order of a master cell group first and then a secondary cell group, or sorting is performed in an order of a secondary cell group first and then a master cell group LCID; or sorting is performed in ascending order of LCIDs of the three paths, and when LCIDs have a same value, sorting is performed in an order of a master cell group first and then a secondary cell group, or sorting is performed in an order of a secondary cell group first and then a master cell group.

In an embodiment of this application, sorting is performed in an order of configuring logical channel identifiers LCIDs of the three paths.

For example, it is assumed that the third indication information indicates initial statuses of the three paths, LCID values of the three paths are 5, 7, and 8, and a configuration order or a configuration time sequence is 8, 7, and 5. In this case, the first path is the path whose LCID is 8, the second path is the path whose LCID is 7, and the second path is the path whose LCID is 5.

In an embodiment of this application, sorting is performed in descending order of logical channel identifiers LCIDs of the three paths.

For example, it is assumed that the third indication information indicates initial statuses of the three paths, and LCID values of the three paths are 5, 7, and 8. In this case, the first path is the path whose LCID is 8, the second path is the path whose LCID is 7, and the second path is the path whose LCID is 5.

In an embodiment of this application, sorting is performed in ascending order of logical channel identifiers LCIDs of the three paths.

For example, it is assumed that the third indication information indicates initial statuses of the three paths, and LCID values of the three paths are 5, 7, and 8. In this case, the first path is the path whose LCID is 5, the second path is the path whose LCID is 7, and the second path is the path whose LCID is 8.

In an embodiment of this application, sorting is performed in an order of cell groups to which LCIDs of the three paths belong, to be specific, sorting is performed in an order of a master cell group LCID first and then a secondary cell group LCID, and sorting is performed in ascending order of LCIDs in each cell group.

FIG. 3 is a schematic diagram in which a first message indicates initial statuses of a plurality of paths according to an embodiment of this application. As shown in FIG. 3, it is assumed that third indication information included in the first message indicates initial statuses of three paths other than a primary path. The three paths are respectively a path whose LCID value is 5 in a master cell group (Master Cell Group, MCG), a path whose LCID value is 5 in a secondary cell group (SCG), and a path whose LCID value is 8 in the secondary cell group (Secondary Cell Group, SCG). A plurality of bits may be sorted in an order of cell groups to which the LCIDs of the three paths belong, to be specific, sorting is performed in an order of a master cell group LCID first and then a secondary cell group LCID, and sorting is performed in ascending order of LCIDs in each cell group.

It should be noted that the master cell group (MCG) is a group of serving/communication cells associated with a master base station and/or provided or served by a master base station, and the secondary cell group (SCG) is a group of serving/communication cells associated with a secondary base station and/or provided or served by a secondary base station.

For example, as shown in FIG. 3, the first bit indicates a first path, and the first path is the path whose MCG LCID is 5; the second bit indicates a second path, and the second path is the path whose SCG LCID is 5; and the third bit indicates a third path, and the third path is the path whose SCG LCID is 8.

In an embodiment of this application, sorting is performed in an order of the cell groups to which the LCIDs of the three paths belong, to be specific, sorting is performed in an order of a master cell group LCID first and then a secondary cell group LCID, and sorting is performed in descending order of LCIDs in each cell group.

FIG. 4 is a schematic diagram in which a first message indicates initial statuses of a plurality of paths according to another embodiment of this application. As shown in FIG. 4, it is assumed that third indication information included in the first message indicates initial statuses of three paths other than a primary path. The three paths are respectively a path whose LCID value is 5 in a master cell group (MCG), a path whose LCID value is 5 in a secondary cell group (SCG), and a path whose LCID value is 8 in the secondary cell group (SCG). A plurality of bits may be sorted in an order of cell groups to which the LCIDs of the three paths belong, to be specific, sorting is performed in an order of a master cell group LCID first and then a secondary cell group LCID, and sorting is performed in descending order of LCIDs in each cell group.

For example, as shown in FIG. 4, the first bit indicates a first path, and the first path is the path whose MCG LCID is 5; the second bit indicates a second path, and the second path is the path whose SCG LCID is 8; and the third bit indicates a third path, and the third path is the path whose SCG LCID is 5.

In an embodiment of this application, sorting is performed in an order of the cell groups to which the LCIDs of the three paths belong, to be specific, sorting is performed in an order of a secondary cell group LCID first and then a master cell group LCID, and sorting is performed in descending order of LCIDs in each cell group.

FIG. 5 is a schematic diagram in which a first message indicates initial statuses of a plurality of paths according to another embodiment of this application. As shown in FIG. 5, it is assumed that third indication information included in the first message indicates initial statuses of three paths other than a primary path. The three paths are respectively a path whose LCID value is 5 in a master cell group (MCG), a path whose LCID value is 5 in a secondary cell group (SCG), and a path whose LCID value is 8 in the secondary cell group (SCG). A plurality of bits may be sorted in an order of cell groups to which the LCIDs of the three paths belong, to be specific, sorting is performed in an order of a secondary cell group LCID first and then a master cell group LCID, and sorting is performed in descending order of LCIDs in each cell group.

For example, as shown in FIG. 5, the first bit indicates a first path, and the first path is the path whose SCG LCID is 8; the second bit indicates a second path, and the second path is the path whose SCG LCID is 5; and the third bit indicates a third path, and the third path is the path whose MCG LCID is 5.

In an embodiment of this application, sorting is performed in an order of the cell groups to which the LCIDs of the three paths belong, to be specific, sorting is performed in an order of a secondary cell group LCID first and then a master cell group LCID, and sorting is performed in ascending order of LCIDs in each cell group.

FIG. 6 is a schematic diagram in which a first message indicates initial statuses of a plurality of paths according to another embodiment of this application. As shown in FIG. 6, it is assumed that third indication information included in the first message indicates initial statuses of three paths other than a primary path. The three paths are respectively a path whose LCID value is 5 in a master cell group (MCG), a path whose LCID value is 5 in a secondary cell group (SCG), and a path whose LCID value is 8 in the secondary cell group (SCG). A plurality of bits may be sorted in an order of cell groups to which the LCIDs of the three paths belong, to be specific, sorting is performed in an order of a secondary cell group LCID first and then a master cell group LCID, and sorting is performed in ascending order of LCIDs in each cell group.

For example, as shown in FIG. 6, the first bit indicates a first path, and the first path is the path whose SCG LCID is 5; the second bit indicates a second path, and the second path is the path whose SCG LCID is 8; and the third bit indicates a third path, and the third path is the path whose MCG LCID is 5.

In an embodiment of this application, sorting is performed in descending order of the LCIDs of the three paths, and when LCIDs have a same value, sorting is performed in an order of a master cell group first and then a secondary cell group.

FIG. 7 is a schematic diagram in which a first message indicates initial statuses of a plurality of paths according to another embodiment of this application. As shown in FIG. 7, it is assumed that third indication information included in the first message indicates initial statuses of three paths other than a primary path. The three paths are respectively a path whose LCID value is 6 in a master cell group (MCG), a path whose LCID value is 6 in a secondary cell group (SCG), and a path whose LCID value is 8 in the secondary cell group (SCG). A plurality of bits may be sorted in descending order of the LCIDs of the three paths, and when LCIDs have a same value, sorting is performed in an order of a master cell group first and then a secondary cell group.

For example, as shown in FIG. 7, the first bit indicates a first path, and the first path is the path whose SCG LCID is 8; the second bit indicates a second path, and the second path is the path whose MCG LCID is 6; and the third bit indicates a third path, and the third path is the path whose SCG LCID is 6.

In an embodiment of this application, sorting is performed in descending order of the LCIDs of the three paths, and when LCIDs have a same value, sorting is performed in an order of a secondary cell group first and then a master cell group.

FIG. 8 is a schematic diagram in which a first message indicates initial statuses of a plurality of paths according to another embodiment of this application. As shown in FIG. 8, it is assumed that third indication information included in the first message indicates initial statuses of three paths other than a primary path. The three paths are respectively a path whose LCID value is 6 in a master cell group (MCG), a path whose LCID value is 6 in a secondary cell group (SCG), and a path whose LCID value is 8 in the secondary cell group (SCG). A plurality of bits may be sorted in descending order of the LCIDs of the three paths, and when LCIDs have a same value, sorting is performed in an order of a secondary cell group first and then a master cell group.

For example, as shown in FIG. 8, the first bit indicates a first path, and the first path is the path whose SCG LCID is 8; the second bit indicates a second path, and the second path is the path whose SCG LCID is 6; and the third bit indicates a third path, and the third path is the path whose MCG LCID is 6.

In an embodiment of this application, sorting is performed in ascending order of LCIDs of the three paths, and when LCIDs have a same value, sorting is performed in an order of a master cell group first and then a secondary cell group.

FIG. 9 is a schematic diagram in which a first message indicates initial statuses of a plurality of paths according to another embodiment of this application. As shown in FIG. 9, it is assumed that third indication information included in the first message indicates initial statuses of three paths other than a primary path. The three paths are respectively a path whose LCID value is 6 in a master cell group (MCG), a path whose LCID value is 6 in a secondary cell group (SCG), and a path whose LCID value is 8 in the secondary cell group (SCG). A plurality of bits may be sorted in ascending order of the LCIDs of the three paths, and sorting is performed in an order of a master cell group first and then a secondary cell group.

For example, as shown in FIG. 9, the first bit indicates a first path, and the first path is the path whose MCG LCID is 6; the second bit indicates a second path, and the second path is the path whose SCG LCID is 6; and the third bit indicates a third path, and the third path is the path whose SCG LCID is 8.

In an embodiment of this application, sorting is performed in ascending order of the LCIDs of the three paths, and when LCIDs have a same value, sorting is performed in an order of a secondary cell group first and then a master cell group.

FIG. 10 is a schematic diagram in which a first message indicates initial statuses of a plurality of paths according to another embodiment of this application. As shown in FIG. 10, it is assumed that third indication information included in the first message indicates initial statuses of three paths other than a primary path. The three paths are respectively a path whose LCID value is 6 in a master cell group (MCG), a path whose LCID value is 6 in a secondary cell group (SCG), and a path whose LCID value is 8 in the secondary cell group (SCG). A plurality of bits may be sorted in ascending order of the LCIDs of the three paths, and when LCIDs have a same value, sorting is performed in an order of a secondary cell group first and then a master cell group.

For example, as shown in FIG. 10, the first bit indicates a first path, and the first path is the path whose SCG LCID is 6; the second bit indicates a second path, and the second path is the path whose MCG LCID is 6; and the third bit indicates a third path, and the third path is the path whose SCG LCID is 8.

It should be noted that the value of the third indication information herein is used to indicate the initial status of the bearer configuration of the first device. For example, when the bearer configuration of the first device is the first bearer configuration, the first bearer configuration may be a duplication configuration, and an initial status of the first bearer configuration includes an activated state and a deactivated state. The foregoing is used as an example for description, and no special limitation is imposed thereto.

In an embodiment of this application, when the bearer of the first device includes N paths, the initial status of the first bearer configuration may include initial statuses of the N paths. The initial status of each path is an activated state or a deactivated state, and the value of the third indication information may be N bits or ranges from 0 to $2^{(N-1)}$ and is used to indicate the initial statuses of the N paths, where N is a positive integer greater than 1.

For example, when the bearer of the first device includes three paths, three bits may be used to indicate that the bearer of the first device includes initial statuses of the three paths, in other words, the three bits are used to indicate the initial statuses of the three paths included in the bearer of the first device.

Optionally, in an embodiment of this application, the bearer of the first device includes three paths, the three paths include one primary path, and the primary path is always in a working state. Therefore, the primary path is in an activated state, in other words, a bit indicating the primary path is always "1".

Optionally, in an implementation of this application, the bearer of the first device includes three paths, and the three paths include one primary path. An initial status of the primary path can be indicated. The primary path may be in a deactivated state, in other words, a bit indicating the primary path may be "0".

When the value of the third indication information is three bits, the three bits respectively indicate initial statuses of the first path, the second path, and the third path other than the primary path.

For example, "111" may be used to indicate that the three paths each are in an activated state; "110" may be used to indicate that the first path and the second path are in an activated state, and the third path is in a deactivated state; "101" may be used to indicate that the first path and the third path are in an activated state, and the second path is in a deactivated state; "100" may be used to indicate that the first path is in an activated state, and the second path and the third path are in a deactivated state; "011" may be used to indicate that the first path is in a deactivated state, and the second path and the third path are in an activated state; "010" may be used to indicate that the first path and the third path are in a deactivated state, and the second path is in an activated state; "001" may be used to indicate that the first path and the second path are in a deactivated state, and the third path is in an activated state; and "000" may be used to indicate that the three paths each are in a deactivated state. It should be understood that, alternatively, "0" may indicate "activated state" and "1" may indicate "deactivated state" herein. This is not limited in this application.

A sequence of the indicated first path, second path, and third path, that is, a correspondence between three bits and the configured paths may be:

sorting is performed in descending order of logical channel identifiers LCIDs of the three paths; or sorting is performed in ascending order of LCIDs of the three paths; or sorting is performed in an order of configuring LCIDs of the three paths; or sorting is performed in an order of cell groups to which LCIDs of the three paths belong, to be specific, sorting is performed in an order of a master cell group LCID first and then a secondary cell group LCID, and sorting is performed in ascending or descending order of LCIDs in each cell group; or sorting is performed in an order of cell groups to which LCIDs of the three paths belong, to be specific, sorting is performed in an order of a secondary cell group LCID first and then a master cell group LCID, and sorting is performed in ascending or descending order of LCIDs in each cell group; or sorting is performed in descending order of LCIDs of the three paths, and when LCIDs have a same value, sorting is performed in an order of a master cell group first and then a secondary cell group, or sorting is performed in an order of a secondary cell group first and then a master cell group; or sorting is performed in ascending order of LCIDs of the three paths, and when LCIDs have a same value, sorting is performed in an order of a master cell group first and then a secondary cell group, or sorting is performed in an order of a secondary cell group first and then a master cell group.

In an embodiment of this application, sorting is performed in descending order of logical channel identifiers LCIDs of the three paths.

For example, it is assumed that LCID values of the three paths are 5, 7, and 8. In this case, the first path is the path whose LCID is 8, the second path is the path whose LCID is 7, and the second path is the path whose LCID is 5.

In an embodiment of this application, sorting is performed in ascending order of logical channel identifiers LCIDs of the three paths.

For example, it is assumed that the third indication information indicates initial statuses of the three paths, and LCID values of the three paths are 5, 7, and 8. In this case, the first path is the path whose LCID is 5, the second path is the path whose LCID is 7, and the second path is the path whose LCID is 8.

In an embodiment of this application, sorting is performed in an order of cell groups to which LCIDs of the three paths belong, to be specific, sorting is performed in an order of a master cell group LCID first and then a secondary cell group LCID, and sorting is performed in ascending order of LCIDs in each cell group.

For example, it is assumed that the third indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose MCG LCID is 5, the second path is the path whose SCG LCID is 5, and the third path is the path whose SCG LCID is 8.

In an embodiment of this application, sorting is performed in an order of cell groups to which LCIDs of the three paths belong, to be specific, sorting is performed in an order of a master cell group LCID first and then a secondary cell group LCID, and sorting is performed in descending order of LCIDs in each cell group.

For example, it is assumed that the third indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose MCG LCID is 5, the second path is the path whose SCG LCID is 8, and the third path is the path whose SCG LCID is 5.

In an embodiment of this application, sorting is performed in an order of cell groups to which LCIDs of the three paths belong, to be specific, sorting is performed in an order of a secondary cell group LCID first and then a master cell group LCID, and sorting is performed in descending order of LCIDs in each cell group.

For example, it is assumed that the third indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose SCG LCID is 8, the second path is the path whose SCG LCID is 5, and the third path is the path whose MCG LCID is 5.

In an embodiment of this application, sorting is performed in an order of cell groups to which LCIDs of the three paths belong, to be specific, sorting is performed in an order of a secondary cell group LCID first and then a master cell group LCID, and sorting is performed in ascending order of LCIDs in each cell group.

For example, it is assumed that the third indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose SCG LCID is 5, the second path is the path whose SCG LCID is 8, and the third path is the path whose MCG LCID is 5.

In an embodiment of this application, sorting is performed in descending order of LCIDs of the three paths, and when LCIDs have a same value, sorting is performed in an order of a master cell group first and then a secondary cell group.

For example, it is assumed that the third indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose SCG LCID is 8, the second path is the path whose MCG LCID is 5, and the third path is the path whose SCG LCID is 5.

In an embodiment of this application, sorting is performed in descending order of LCIDs of the three paths, and when LCIDs have a same value, sorting is performed in an order of a secondary cell group LCID first and then a master cell group LCID.

For example, it is assumed that the third indication information indicates initial statuses of the three paths, and the three paths are a path whose LCID value is 5 in a master cell group (MCG), a path whose LCID value is 5 in a secondary cell group (SCG), and a path whose LCID value is 8 in the secondary cell group (SCG). In this case, the first path is the path whose SCG LCID is 8, the second path is the path whose SCG LCID is 5, and the third path is the path whose MCG LCID is 5.

In an embodiment of this application, sorting is performed in ascending order of LCIDs of the three paths, and when LCIDs have a same value, sorting is performed in an order of a master cell group first and then a secondary cell group.

For example, it is assumed that the third indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose MCG LCID is 5, the second path is the path whose SCG LCID is 5, and the third path is the path whose SCG LCID is 8.

In an embodiment of this application, sorting is performed in ascending order of LCIDs of the three paths, and when LCIDs have a same value, sorting is performed in an order of a secondary cell group LCID first and then a master cell group LCID.

For example, it is assumed that the third indication information indicates initial statuses of the three paths, and the three paths are respectively a path whose LCID value is 5 in a master cell group (MCG), a path whose LCID value is 5 in a secondary cell group (SCG), and a path whose LCID value is 8 in the secondary cell group (SCG). In this case, the first path is the path whose SCG LCID is 5, the second path is the path whose MCG LCID is 5, and the third path is the path whose SCG LCID is 8.

In an embodiment of this application, sorting is performed in an order of configuring LCIDs of the three paths.

For example, it is assumed that the third indication information indicates initial statuses of the three paths, LCID values of the three paths are 5, 7, and 8, and a configuration order is 8, 7, and 5. In this case, the first path is the path whose LCID is 8, the second path is the path whose LCID is 7, and the second path is the path whose LCID is 5.

In an embodiment of this application, sorting is performed in an order of configuring LCIDs of the three paths.

For example, it is assumed that the third indication information indicates initial statuses of the three paths, LCID values of the three paths are 5, 7, and 8, and a primary path is a path whose LCID is 7. In this case, the primary path may be specified as a first path, that is, the most significant bit of a bit string, in other words, the first path is the path whose LCID is 7. Alternatively, the primary path is specified as a third path, that is, the least significant bit of a bit string, in other words, the third path is the path whose LCID is 7. The remaining two paths are sorted in a specific order, for example, in an order of LCID values or in an order of cell groups. This is similar to another sorting method mentioned in this embodiment. Details are not described herein again.

It should be noted that the value of the third indication information herein is used to indicate the initial status of the bearer configuration of the first device. For example, when the bearer configuration of the first device is the first bearer configuration, the first bearer configuration may be a duplication configuration, and the initial status of the first bearer configuration includes an activated state and a deactivated state. The foregoing is used as an example for description, and no special limitation is imposed thereto.

In an embodiment of this application, when the bearer of the first device includes N paths, the initial status of the first bearer configuration may include initial statuses of N−1 paths in the N paths other than a primary path. The initial statuses of the N−1 paths include an activated state or a deactivated state, the value of the third indication information may be M bits, or ranges from 0 to $2^{(M-1)}$, and each of the M bits or each of M bits obtained after binary conversion is used to indicate that an initial status of each of at least one of the N−1 paths is the activated state or the deactivated state, where N is greater than M, and both N and M are positive integers greater than 1.

In this embodiment of this application, when the value of the third indication information is a plurality of bits or is a plurality of bits obtained after binary conversion, the plurality of bits are sorted in descending order of logical channel identifiers LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a master cell group LCID first and then a secondary cell group LCID, and sorting is performed in descending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in descending order of LCIDs of a plurality of paths in each cell group; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

For example, when the value of the third indication information is three bits, the three bits respectively indicate initial statuses of the first path, the second path, and the third path other than the primary path. It should be understood that the first path, the second path, and the third path include at least one path.

For example, "111" may be used to indicate that the three paths each are in an activated state; "110" may be used to indicate that the first path and the second path are in an activated state, and the third path is in a deactivated state; "101" may be used to indicate that the first path and the third path are in an activated state, and the second path is in a deactivated state; "100" may be used to indicate that the first path is in an activated state, and the second path and the third path are in a deactivated state; "011" may be used to indicate that the first path is in a deactivated state, and the second path and the third path are in an activated state; "010" may be used to indicate that the first path and the third path are in a deactivated state, and the second path is in an activated state; "001" may be used to indicate that the first path and the second path are in a deactivated state, and the third path is in an activated state; and "000" may be used to indicate that the three paths each are in a deactivated state. It should be understood that, alternatively, "0" may indicate "activated state" and "1" may indicate "deactivated state" herein. This is not limited in this application.

For example, there are five configured paths, and three bits are used to indicate the first path, the second path, and the third path, in other words, the three bits are used to indicate initial statuses of the four configured paths.

Optionally, in an embodiment of this application, correspondences of the first path, the second path, and the third path are determined based on grouping statuses of the four configured paths other than the primary path and corresponding LCIDs. A sorting method may be the same as the sorting method in the foregoing embodiment. Details are not described herein again.

Optionally, in an embodiment of this application, a quantity of bits of the third indication information corresponds to a quantity of cell groups, and each bit indicates an initial status of a path in a corresponding cell group. For example, when the first information includes two bits, the first bit corresponds to all paths in an MCG, and the second bit corresponds to all paths in an SCG. For another example, when there are more than two cell groups, for example, when there are four cell groups, the first information includes four bits, the first bit corresponds to all paths in an MCG, and correspondences of the last three bits and the three SCGs are determined based on sorting of the SCGs.

Optionally, in an embodiment of this application, a quantity of bits of the third indication information corresponds to a quantity of cell groups, and each bit indicates an initial status of a path in a corresponding cell group other than a primary path. For example, when the first information includes two bits, the first bit corresponds to all paths in an MCG, and the second bit corresponds to all paths in an SCG.

FIG. 11 is a schematic diagram in which a first message indicates initial statuses of a plurality of paths other than a primary path according to another embodiment of this application. As shown in FIG. 11, it is assumed that third indication information included in the first message includes two bits. The first bit is used to indicate initial statuses of all paths in a master cell group, for example, an initial status of a path whose LCID value is 5. The second bit indicates initial statuses of all paths in a secondary cell group, for example, an initial status of a path whose LCID value is 5 and an initial status of a path whose LCID value is 8 in the secondary cell group.

Optionally, in an embodiment of this application, when there are more than two cell groups, for example, when there are four cell groups, the first information includes four bits, the first bit corresponds to all paths in an MCG other than the primary path, and correspondences of the last three bits and the three SCGs are determined based on sorting of the SCGs. It should be understood that the primary path may alternatively be a path in an SCG.

FIG. 12 is a schematic diagram in which a first message indicates initial statuses of a plurality of paths other than a primary path according to another embodiment of this application. As shown in FIG. 12, it is assumed that third indication information included in the first message includes four bits used to indicate initial statuses of paths in four cell groups. The paths include: a path whose LCID value is 5 in a master cell group; a path whose LCID value is 5 and a path whose LCID value is 8 in a secondary cell group 1; a path whose LCID value is 1 and a path whose LCID value is 3 in a secondary cell group 2; and a path whose LCID value is 2 and a path whose LCID value is 8 in a secondary cell group 3. The first bit in the third indication information is used to indicate initial statuses of all paths in the master cell group, the second bit in the third indication information is used to indicate initial statuses of all paths in the secondary cell group 1, the third bit in the third indication information is used to indicate initial statuses of all paths in the secondary cell group 2, and the fourth bit in the third indication information is used to indicate initial statuses of all paths in the secondary cell group 3.

Optionally, in an embodiment of this application, if a quantity of bits of the third indication information is 1, the one bit corresponds to initial statuses of all paths other than the primary path.

FIG. 13 is a schematic diagram in which a first message indicates initial statuses of a plurality of paths other than a primary path according to another embodiment of this application. As shown in FIG. 13, it is assumed that third indication information included in the first message indicates initial statuses of three paths other than the primary path. The three paths are respectively a path whose LCID value is 5 in a master cell group (MCG), a path whose LCID value is 5 in a secondary cell group (SCG), and a path whose LCID value is 8 in the secondary cell group (SCG). One bit in the third indication information is used to indicate initial statuses of all paths other than the primary path.

Optionally, in an embodiment of this application, initial statuses of paths included in different cell groups are the same, and the one bit is used to indicate initial statuses of all paths in a cell group.

FIG. 14 is a schematic diagram in which a first message indicates initial statuses of a plurality of paths other than a primary path according to another embodiment of this application. As shown in FIG. 14, the first bit in the third indication information included in the first message indicates initial statuses of all paths in a master cell group, and the master cell group includes a path whose LCID value is 6. The second bit in the third indication information indicates initial statuses of all paths in a secondary cell group, and the secondary cell group includes a path whose LCID value is 5 and a path whose LCID value is 8.

Optionally, in an embodiment of this application, the initial statuses of all paths including the primary path in the cell group each are always an activated state.

It should be noted that the value of the third indication information herein is used to indicate the initial status of the bearer configuration of the first device. For example, when the bearer configuration of the first device is the first bearer configuration, the first bearer configuration may be a duplication configuration, and an initial status of the first bearer configuration includes an activated state and a deactivated state. The foregoing is used as an example for description, and no special limitation is imposed thereto.

In an embodiment of this application, when the bearer of the first device includes N paths, the initial status of the first bearer configuration may include initial statuses of the N paths. The initial status of each path is an activated state or a deactivated state. The value of the third indication information is M bits or ranges from 0 to $2^{(M-1)}$, and each of the M bits or each of M bits obtained after binary conversion is used to indicate that an initial status of each of at least one of the N paths is the activated state or the deactivated state, where N is greater than M, and both N and M are positive integers greater than 1.

In this embodiment of this application, when the value of the third indication information is a plurality of bits or is a plurality of bits obtained after binary conversion, the plurality of bits are sorted in descending order of logical channel identifiers LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in ascending order of LCIDs of a plurality of paths in each cell group; or the plurality of bits are sorted in an order of cell groups to which LCIDs of the plurality of paths belong, to be specific, sorting is performed in an order of a master cell group LCID first and then a secondary cell group LCID, and sorting is performed in descending order of LCIDs of a plurality of paths in each cell group; or the plurality of bits are sorted in an order of cell groups to which LCIDs of the plurality of paths belong, to be specific, sorting is performed in an order of a secondary cell group LCID first and then a master cell group LCID, and sorting is performed in descending order of LCIDs of a plurality of paths in each cell group; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

For example, when the value of the third indication information is three bits, the three bits respectively indicate initial statuses of a first path, a second path, and a third path. It should be understood that the first path, the second path, and the third path include at least one path.

For example, "111" may be used to indicate that the three paths each are in an activated state; "110" may be used to indicate that the first path and the second path are in an activated state, and the third path is in a deactivated state; "101" may be used to indicate that the first path and the third path are in an activated state, and the second path is in a deactivated state; "100" may be used to indicate that the first path is in an activated state, and the second path and the third path are in a deactivated state; "011" may be used to indicate that the first path is in a deactivated state, and the second path and the third path are in an activated state; "010" may be used to indicate that the first path and the third path are in a deactivated state, and the second path is in an activated state; "001" may be used to indicate that the first path and the second path are in a deactivated state, and the third path is in an activated state; and "000" may be used to indicate that the three paths each are in a deactivated state. It should be understood that, alternatively, "0" may indicate "activated state" and "1" may indicate "deactivated state" herein. This is not limited in this application.

For example, there are five configured paths, and three bits are used to indicate the first path, the second path, and the third path, in other words, the three bits are used to indicate initial statuses of the five configured paths.

It should be understood that, when the three bits are used to indicate the initial statuses of the five paths, the first path may be considered as a first path group including at least one path, and one of the three bits is used to indicate an initial status of the at least one path.

Optionally, in an embodiment of this application, one bit in the third indication information is used to indicate an initial status of the primary path, and another bit is used to indicate a remaining path.

FIG. 15 is a schematic diagram in which a first message indicates initial statuses of a plurality of paths according to another embodiment of this application. As shown in FIG. 13, the first bit in third indication information included in the first message indicates an initial status of a primary path, and the second bit in the third indication information indicates initial statuses of all paths in a master cell group and a secondary cell group. The master cell group includes a path whose LCID value is 5, and the secondary cell group includes a path whose LCID value is 5 and a path whose LCID value is 8. FIG. 16 is a schematic diagram in which a first message indicates initial statuses of a plurality of paths according to another embodiment of this application. As shown in FIG. 16, third indication information included in the first message indicates initial statuses of the plurality of paths. The five paths are respectively a path whose LCID value is 2 and a path whose LCID value is 5 in a master cell group (MCG), and a path whose LCID value is 5, a path whose LCID value is 8, and a path whose LCID value is 6 in a secondary cell group (SCG). Three bits of the third indication information are used to indicate the initial statuses of the five paths. For example, the first bit in the three bits indicates a first path, and the first path may be the two paths in the master cell: the path whose LCID value is 2 and the path whose LCID value is 5. The second bit indicates a second path, and the second path may be two paths in the secondary cell group: the path whose LCID value is 5 and the path whose LCID value is 8. The third bit indicates a third path, the third path may be one path in the secondary cell group: the path whose LCID value is 6. It should be understood that an example is used above for description, and does not limit this application.

Optionally, in an embodiment of this application, a quantity of bits of the third indication information corresponds to a quantity of cell groups, and each bit indicates an initial status of a path in a corresponding cell group. For example, when the first information includes two bits, the first bit corresponds to all paths in an MCG, and the second bit corresponds to all paths in an SCG. For another example, when there are more than two cell groups, for example, when there are four cell groups, the first information includes four bits, the first bit corresponds to all paths in an MCG, and correspondences of the last three bits and the three SCGs are determined based on sorting of the SCGs.

Optionally, in an embodiment of this application, a quantity of bits of the third indication information corresponds to a quantity of cell groups, and each bit indicates an initial status of a path in a corresponding cell group. For example, when the first information includes two bits, the first bit corresponds to all paths in an MCG, and the second bit corresponds to all paths in an SCG.

FIG. 17 is a schematic diagram in which a first message indicates initial statuses of a plurality of paths according to another embodiment of this application. As shown in FIG. 17, it is assumed that third indication information included in the first message includes two bits. The first bit is used to indicate all paths in a master cell group, for example, an initial status of a primary path whose LCID value is 2 and an initial status of a path whose LCID value is 5. The second bit indicates all paths in a secondary cell group, for example, an initial status of a path whose LCID value is 5 and a path whose LCID value is 8 in a secondary cell group.

Optionally, in an embodiment of this application, when there are more than two cell groups, for example, when there are four cell groups, the first information includes four bits, the first bit corresponds to all paths in an MCG, and correspondences of the last three bits and the three SCGs are determined based on sorting of the SCGs.

FIG. 18 is a schematic diagram in which a first message indicates initial statuses of a plurality of paths according to another embodiment of this application. As shown in FIG. 18, it is assumed that third indication information included in the first message includes four bits used to indicate initial statuses of paths in four cell groups. The paths include: a primary path whose LCID value is 2 and a path whose LCID value is 5 in a master cell group; a path whose LCID value is 5 and a path whose LCID value is 8 in a secondary cell group 1; a path whose LCID value is 1 and a path whose LCID value is 3 in a secondary cell group 2; and a path whose LCID value is 2 and a path whose LCID value is 8 in a secondary cell group 3. The first bit in the third indication information is used to indicate initial statuses of all the paths in the master cell group. The second bit in the third indication information is used to indicate initial statuses of all the paths in the secondary cell group 1. The third bit in the third indication information is used to indicate initial statuses of all the paths in the secondary cell group 2. The fourth bit in the third indication information is used to indicate initial statuses of all the paths in the secondary cell group 3.

Optionally, in an embodiment of this application, initial statuses of all paths including a primary path in a cell group each are always an activated state.

Optionally, in an embodiment of this application, correspondences of the first path, the second path, and the third path are determined based on grouping statuses of the five configured paths and corresponding LCIDs. A sorting method may be the same as the sorting method in the foregoing embodiment. Details are not described herein again.

Optionally, in an embodiment of this application, a quantity of bits of the third indication information corresponds to a quantity of cell groups, and each bit indicates an initial status of a path in a corresponding cell group. For example, when the first information includes two bits, the first bit corresponds to all paths in an MCG, and the second bit corresponds to all paths in an SCG. For another example, when there are more than two cell groups, for example, when there are four cell groups, the first information includes four bits, the first bit corresponds to all paths in an MCG, and correspondences of the last three bits and the three SCGs are determined based on sorting of the SCGs.

It should be noted that the value of the third indication information herein is used to indicate the initial status of the bearer configuration of the first device. For example, when the value of the first indication information indicates that the bearer configuration of the first device is the first bearer configuration, the first bearer configuration may be a duplication configuration, and an initial status of the first bearer configuration includes an activated state and a deactivated state. The foregoing is used as an example for description, and no special limitation is imposed thereto.

The foregoing provides detailed descriptions: The first message includes the third indication information, and the value of the third indication information is used to indicate the initial status of the bearer configuration of the first device. It should be understood that an example is used above for description, and no limitation is imposed on this embodiment of this application.

Manner 3

In this embodiment of this application, the first message may include fourth indication information, and a value of the fourth indication information is used to indicate the bearer configuration and an initial status of the bearer configuration.

For example, the first message includes the fourth indication information, and the fourth indication information may be the following indication information:

pdcp-Duplication whose value range is {1, 2, 3}.

Specifically, the bearer configuration and/or the initial status of the bearer of the first device may be indicated based on the value of the fourth indication information. For example, when the value of the field is 1, it indicates that the bearer of the first device is in an activated state of the first bearer configuration.

When the value of this field is 2, it indicates that the bearer of the first device is in a deactivated state of the first bearer configuration. When the value of the field is 3, it indicates that the bearer of the first device is the second bearer configuration. The first bearer may be a bearer configured with duplication, and the second bearer may be a split bearer. The foregoing is used as an example for description, and no special limitation is imposed thereto.

Manner 4

In this embodiment of this application, when the first message includes fifth indication information, it indicates that the bearer of the first device is the second bearer configuration.

For example, the first message may include the following fifth indication information:

Split.

The first message includes the field. When the field is set, it indicates that the bearer of the first device is the second bearer configuration.

In this embodiment of this application, when the first message may include the sixth indication information but does not include the fifth indication information, it indicates that the bearer of the first device is the first bearer configuration, and the bearer of the first device is in an activated state.

For example, the first message includes the following sixth indication information:

pdcp-Duplication.

The first message includes the field. When the field is set, it indicates that the bearer of the first device is the first bearer configuration, and the bearer of the first device is in an activated state. The first bearer may be a bearer configured with duplication, and the second bearer may be a split bearer. The foregoing is used as an example for description, and no special limitation is imposed thereto.

In this embodiment of this application, when the first message includes neither the fifth indication information nor the sixth indication information, it indicates that the bearer of the first device is the bearer of the first bearer, and the bearer of the first device is in the deactivated state.

For example, the first message may not include the field of the fifth indication information and the field of the sixth indication information.

In this embodiment of this application, the bearer of the first device may be a radio bearer, or the bearer of the first device is a signaling bearer.

It should be understood that sequence numbers of the foregoing processes do not mean execution sequences in the embodiments of this application. The execution sequences of the processes need to be determined based on functions and internal logic of the processes, and should not be construed as any limitation on the implementation processes of the embodiments of this application.

The foregoing describes in detail the communication method according to this embodiment of this application. The first device receives the first message sent by the second device, and determines both the bearer configuration of the bearer of the first device and the initial status of the bearer configuration of the first device based on the first message. This improves communication efficiency. The following describes a communications device in the communication method according to the embodiments of this application. It should be understood that the communications device in the embodiments of this application may perform the various communication methods in the foregoing embodiments of the present invention. In other words, for specific working processes of the following products, refer to corresponding processes in the foregoing method embodiments.

Figure 19:
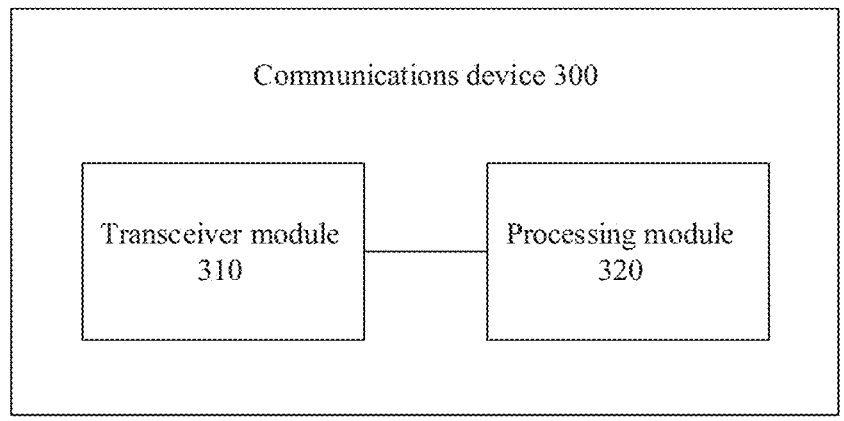
FIG. 19 is a schematic block diagram of a communications device according to an embodiment of this application.

FIG. 19 is a schematic block diagram of a communications device 300 according to an embodiment of this application (the communications device in FIG. 19 may be any terminal device in FIG. 1). As shown in FIG. 19, the communications device 300 includes:

a transceiver module 310, configured to receive a first message sent by a second device, where the first message is used to indicate a bearer configuration of a bearer of the first device and an initial status of the bearer configuration, and the bearer configuration includes a first bearer configuration and/or a second bearer configuration; and a processing module 320, configured to determine the bearer configuration and the initial status of the bearer configuration based on the first message.

In this embodiment of this application, the communications device may be a terminal, and the second device may be an access network device. For example, the second device may be a base station.

It should be noted that, in this embodiment of this application, the bearer of the first device may include a radio bearer or a signaling bearer, and the bearer configuration may include the first bearer configuration and the second bearer configuration. The first bearer configuration may be to configure a bearer with duplication, and/or the second bearer configuration may be a split split bearer. It should be understood that the bearer configuration may include the first bearer configuration and the second bearer configuration, or may include the first bearer configuration, the second bearer configuration, and a third bearer configuration. This is not limited in this application.

In the technical solution in this embodiment of this application, the first device receives the first message sent by the second device, and determines both the bearer configuration of the bearer of the first device and the initial status of the bearer configuration of the first device based on the first message. This improves communication efficiency.

Optionally, when the first message includes first indication information, it indicates that the bearer configuration is the first bearer configuration.

Alternatively, when the first message does not include first indication information, it indicates that the bearer configuration is the second bearer configuration.

Optionally, when the first message includes the first indication information, a value of the first indication information is used to indicate an initial status of the first bearer configuration.

Optionally, when the bearer of the first device includes two paths, the value of the first indication information is used to indicate the initial status of the first bearer configuration, and the initial status includes an activated state or a deactivated state.

Optionally, when the bearer of the first device includes N paths, the initial status of the first bearer configuration includes initial statuses of N−1 paths in the N paths other than a primary path, the initial statuses of the N−1 paths each are an activated state or a deactivated state, and the value of the first indication information is one bit or ranges from 0 to 1, and is used to indicate the initial statuses of the N−1 paths, where N is a positive integer greater than 1.

Optionally, when the bearer of the first device includes N paths, the initial status of the first bearer configuration includes initial statuses of N−1 paths in the N paths other than a primary path. The initial statuses of the N−1 paths include an activated state or a deactivated state, and the value of the first indication information is N−1 bits or ranges from 0 to $2^{(N-1)}-1$ and is used to indicate the initial statuses of the N−1 paths, where N is a positive integer greater than 1.

Optionally, when the bearer of the first device includes N paths, the initial status of the first bearer configuration includes initial statuses of the N paths, the initial status of each path is an activated state or a deactivated state, and the value of the first indication information is N bits or ranges from 0 to $2^{(N-1)}$, and is used to indicate the initial statuses of the N paths, where N is a positive integer greater than 1.

Optionally, when the bearer of the first device includes N paths, the initial status of the first bearer configuration includes initial statuses of N−1 paths in the N paths other than a primary path. The initial statuses of the N−1 paths include an activated state or a deactivated state. The value of the first indication information is M bits or ranges from 0 to $2^{(M-1)}$, and each of the M bits or each of M bits obtained after binary conversion is used to indicate that an initial status of each of at least one of the N−1 paths is the activated state or the deactivated state, where N is greater than M, and both N and M are positive integers greater than 1.

Optionally, when the bearer of the first device includes N paths, the initial status of the first bearer configuration includes initial statuses of the N paths. The initial status of each path is an activated state or a deactivated state. The value of the first indication information is M bits or ranges from 0 to $2^{(M-1)}$, and each of the M bits or each of M bits obtained after binary conversion is used to indicate that an initial status of each of at least one of the N paths is the activated state or the deactivated state, where N is greater than M, and both N and M are positive integers greater than 1.

Optionally, when the value of the first indication information is a plurality of bits or is a plurality of bits obtained after binary conversion, the plurality of bits are sorted in descending order of logical channel identifiers LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and logical channel identifiers in each cell group are sorted in ascending order of LCIDs of a plurality of paths; or the plurality of bits are sorted in an order of cell groups to which LCIDs of the plurality of paths belong, to be specific, sorting is performed in an order of a secondary cell group LCID first and then a master cell group LCID, and logical channel identifiers in each cell group are sorted in ascending order of LCIDs of a plurality of paths; or the plurality of bits are sorted in an order of cell groups to which LCIDs of the plurality of paths belong, to be specific, sorting is performed in an order of a master cell group LCID first and then a secondary cell group LCID, and logical channel identifiers in each cell group are sorted in descending order of LCIDs of a plurality of paths; or the plurality of bits are sorted in an order of cell groups to which LCIDs of the plurality of paths belong, to be specific, sorting is performed in an order of a secondary cell group LCID first and then a master cell group LCID, and logical channel identifiers in each cell group are sorted in descending order of LCIDs of a plurality of paths; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

Optionally, the first message includes second indication information, and the second indication information is used to indicate the bearer configuration.

Optionally, the first message further includes third indication information, and the third indication information is used to indicate the initial status of the bearer configuration.

Optionally, when the bearer of the first device includes two paths, a value of the third indication information is used to indicate an initial status of the first bearer configuration, and the initial status includes an activated state or a deactivated state.

Optionally, when the bearer of the first device includes N paths, the initial status of the first bearer configuration includes initial statuses of N−1 paths in the N paths other than a primary path, the initial statuses of the N−1 paths each are an activated state or a deactivated state, and the value of the third indication information is one bit or ranges from 0 to 1, and is used to indicate the initial statuses of the N−1 paths, where N is a positive integer greater than 1.

Optionally, when the bearer of the first device includes N paths, the initial status of the first bearer configuration includes initial statuses of N−1 paths in the N paths other than a primary path. The initial statuses of the N−1 paths include an activated state or a deactivated state, and the value of the third indication information is N−1 bits or ranges from 0 to $2^{(N-1)}-1$, and is used to indicate the initial statuses of the N−1 paths, where N is a positive integer greater than 1.

Optionally, when the bearer of the first device includes N paths, the initial status of the first bearer configuration includes initial statuses of the N paths, the initial status of each path is an activated state or a deactivated state, and the value of the third indication information is N bits or ranges from 0 to $2^{(N-1)}$, and is used to indicate the initial statuses of the N paths, where N is a positive integer greater than 1.

Optionally, when the bearer of the first device includes N paths, the initial status of the first bearer configuration includes initial statuses of N−1 paths in the N paths other than a primary path. The initial statuses of the N−1 paths include an activated state or a deactivated state. The value of the third indication information is M bits or ranges from 0 to $2^{(M-1)}$, and each of the M bits or each of M bits obtained after binary conversion is used to indicate that an initial status of each of at least one of the N−1 paths is the activated state or the deactivated state, where N is greater than M, and both N and M are positive integers greater than 1.

Optionally, when the bearer of the first device includes N paths, the initial status of the first bearer configuration includes initial statuses of the N paths. The initial status of each path is an activated state or a deactivated state. The value of the third indication information is M bits or ranges from 0 to $2^{(M-1)}$, and each of the M bits or each of M bits obtained after binary conversion is used to indicate that an initial status of each of at least one of the N paths is the activated state or the deactivated state, where N is greater than M, and both N and M are positive integers greater than 1.

Optionally, when the value of the third indication information is a plurality of bits or is a plurality of bits obtained after binary conversion, the plurality of bits are sorted in descending order of LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and logical channel identifiers in each cell group are sorted in ascending order of LCIDs of a plurality of paths; or the plurality of bits are sorted in an order of cell groups to which LCIDs of the plurality of paths belong, to be specific, sorting is performed in an order of a secondary cell group LCID first and then a master cell group LCID, and logical channel identifiers in each cell group are sorted in ascending order of LCIDs of a plurality of paths; or the plurality of bits are sorted in an order of cell groups to which LCIDs of the plurality of paths belong, to be specific, sorting is performed in an order of a master cell group LCID first and then a secondary cell group LCID, and logical channel identifiers in each cell group are sorted in descending order of LCIDs of a plurality of paths; or the plurality of bits are sorted in an order of cell groups to which LCIDs of the plurality of paths belong, to be specific, sorting is performed in an order of a secondary cell group LCID first and then a master cell group LCID, and logical channel identifiers in each cell group are sorted in descending order of LCIDs of a plurality of paths; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

Optionally, the first message includes fourth indication information, and a value of the fourth indication information is used to indicate the bearer configuration and the initial status of the bearer configuration.

Optionally, when the first message includes fifth indication information, it indicates that the bearer configuration is the second bearer configuration.

Alternatively, when the first message includes sixth indication information but does not include the fifth indication information, it indicates that the bearer configuration is the first bearer configuration, and an initial status of the first bearer configuration is an activated state.

Alternatively, when the first message includes neither the fifth indication information nor the sixth indication information, it indicates that the bearer configuration is the first bearer configuration, and an initial status of the first bearer configuration is a deactivated state.

Figure 20:
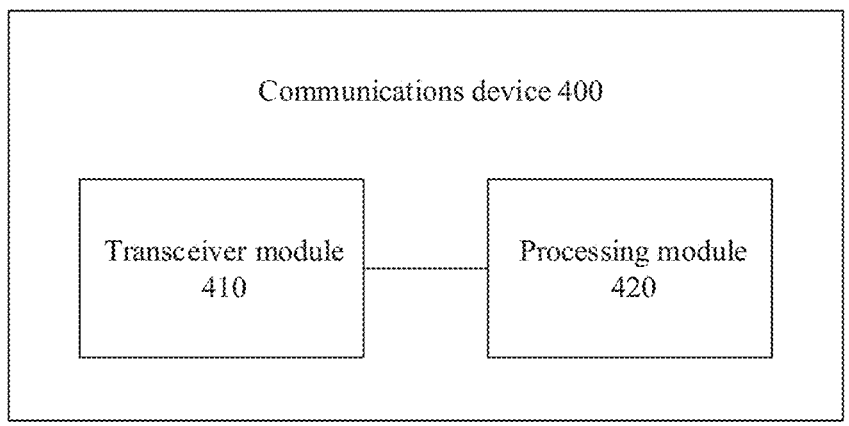
FIG. 20 is another schematic block diagram of a communications device according to an embodiment of this application.

FIG. 20 is a schematic block diagram of a communications device 400 according to an embodiment of this application (the communications device in FIG. 20 may be the base station in FIG. 1). As shown in FIG. 20, the communications device 400 includes:

a processing module 420, configured to configure a bearer configuration of a bearer of a first device and an initial status of the bearer configuration; and a transceiver module 410, configured to send a first message to the first device, where the first message is used to indicate the bearer configuration and the initial status of the bearer configuration, and the bearer configuration includes a first bearer configuration and/or a second bearer configuration.

In this embodiment of this application, the first device may be any terminal device in FIG. 1.

It should be noted that, in this embodiment of this application, the bearer of the first device may include a radio bearer or a signaling bearer, and the bearer configuration may include the first bearer configuration and the second bearer configuration. The first bearer configuration may be to configure a bearer with duplication, and/or the second bearer configuration may be a split split bearer. It should be understood that the bearer configuration may include the first bearer configuration and the second bearer configuration, or may include the first bearer configuration, the second bearer configuration, and a third bearer configuration. This is not limited in this application.

In the technical solution in this embodiment of this application, a second device configures the bearer configuration of the bearer of the first device and the initial status of the bearer configuration, and sends the first message to the first device. The first message is used to indicate both the bearer configuration of the bearer of the first device and the initial status of the bearer configuration of the first device. This improves communication efficiency.

Optionally, when the first message includes first indication information, it indicates that the bearer configuration is the first bearer configuration.

Alternatively, when the first message does not include first indication information, it indicates that the bearer configuration is the second bearer configuration.

Optionally, when the first message includes the first indication information, a value of the first indication information is used to indicate an initial status of the first bearer configuration.

Optionally, when the bearer of the first device includes two paths, the value of the first indication information is used to indicate the initial status of the first bearer configuration, and the initial status includes an activated state or a deactivated state.

Optionally, when the bearer of the first device includes N paths, the initial status of the first bearer configuration includes initial statuses of N−1 paths in the N paths other than a primary path, the initial statuses of the N−1 paths each are an activated state or a deactivated state, and the value of the first indication information is one bit or ranges from 0 to 1, and is used to indicate the initial statuses of the N−1 paths, where N is a positive integer greater than 1.

Optionally, when the bearer of the first device includes N paths, the initial status of the first bearer configuration includes initial statuses of N−1 paths in the N paths other than a primary path. The initial statuses of the N−1 paths include an activated state or a deactivated state, and the value of the first indication information is N−1 bits or ranges from 0 to $2^{(N-1)}-1$ and is used to indicate the initial statuses of the N−1 paths, where N is a positive integer greater than 1.

Optionally, when the bearer of the first device includes N paths, the initial status of the first bearer configuration includes initial statuses of the N paths, the initial status of each path is an activated state or a deactivated state, and the value of the first indication information is N bits or ranges from 0 to $2^{(N-1)}$, and is used to indicate the initial statuses of the N paths, where N is a positive integer greater than 1.

Optionally, when the bearer of the first device includes N paths, the initial status of the first bearer configuration includes initial statuses of N−1 paths in the N paths other than a primary path. The initial statuses of the N−1 paths include an activated state or a deactivated state. The value of the first indication information is M bits or ranges from 0 to $2^{(M-1)}$, and each of the M bits or each of M bits obtained after binary conversion is used to indicate that an initial status of each of at least one of the N−1 paths is the activated state or the deactivated state, where N is greater than M, and both N and M are positive integers greater than 1.

Optionally, when the bearer of the first device includes N paths, the initial status of the first bearer configuration includes initial statuses of the N paths. The initial status of each path is an activated state or a deactivated state. The value of the first indication information is M bits or ranges from 0 to $2^{(M-1)}$, and each of the M bits or each of M bits obtained after binary conversion is used to indicate that an initial status of each of at least one of the N paths is the activated state or the deactivated state, where N is greater than M, and both N and M are positive integers greater than 1.

Optionally, when the value of the first indication information is a plurality of bits or is a plurality of bits obtained after binary conversion, the plurality of bits are sorted in descending order of logical channel identifiers LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and logical channel identifiers in each cell group are sorted in ascending order of LCIDs of a plurality of paths; or the plurality of bits are sorted in an order of cell groups to which LCIDs of the plurality of paths belong, to be specific, sorting is performed in an order of a secondary cell group LCID first and then a master cell group LCID, and logical channel identifiers in each cell group are sorted in ascending order of LCIDs of a plurality of paths; or the plurality of bits are sorted in an order of cell groups to which LCIDs of the plurality of paths belong, to be specific, sorting is performed in an order of a master cell group LCID first and then a secondary cell group LCID, and logical channel identifiers in each cell group are sorted in descending order of LCIDs of a plurality of paths; or the plurality of bits are sorted in an order of cell groups to which LCIDs of the plurality of paths belong, to be specific, sorting is performed in an order of a secondary cell group LCID first and then a master cell group LCID, and logical channel identifiers in each cell group are sorted in descending order of LCIDs of a plurality of paths; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

Optionally, the first message includes second indication information, and the second indication information is used to indicate the bearer configuration.

Optionally, the first message further includes third indication information, and the third indication information is used to indicate the initial status of the bearer configuration.

Optionally, when the bearer of the first device includes two paths, a value of the third indication information is used to indicate an initial status of the first bearer configuration, and the initial status includes an activated state or a deactivated state.

Optionally, when the bearer of the first device includes N paths, the initial status of the first bearer configuration includes initial statuses of N−1 paths in the N paths other than a primary path, the initial statuses of the N−1 paths each are an activated state or a deactivated state, and the value of the third indication information is one bit or ranges from 0 to 1, and is used to indicate the initial statuses of the N−1 paths, where N is a positive integer greater than 1.

Optionally, when the bearer of the first device includes N paths, the initial status of the first bearer configuration includes initial statuses of N−1 paths in the N paths other than a primary path. The initial statuses of the N−1 paths include an activated state or a deactivated state, and the value of the third indication information is N−1 bits or ranges from 0 to $2^{(N-1)}-1$ and is used to indicate the initial statuses of the N−1 paths, where N is a positive integer greater than 1.

Optionally, when the bearer of the first device includes N paths, the initial status of the first bearer configuration includes initial statuses of the N paths, the initial status of each path is an activated state or a deactivated state, and the value of the third indication information is N bits or ranges from 0 to $2^{(N-1)}$, and is used to indicate the initial statuses of the N paths, where N is a positive integer greater than 1.

Optionally, when the bearer of the first device includes N paths, the initial status of the first bearer configuration includes initial statuses of N−1 paths in the N paths other than a primary path. The initial statuses of the N−1 paths include an activated state or a deactivated state. The value of the third indication information is M bits or ranges from 0 to $2^{(M-1)}$, and each of the M bits or each of M bits obtained after binary conversion is used to indicate that an initial status of each of at least one of the N−1 paths is the activated state or the deactivated state, where N is greater than M, and both N and M are positive integers greater than 1.

Optionally, when the bearer of the first device includes N paths, the initial status of the first bearer configuration includes initial statuses of the N paths. The initial status of each path is an activated state or a deactivated state. The value of the third indication information is M bits or ranges from 0 to $2^{(M-1)}$, and each of the M bits or each of M bits obtained after binary conversion is used to indicate that an initial status of each of at least one of the N paths is the activated state or the deactivated state, where N is greater than M, and both N and M are positive integers greater than 1.

Optionally, when the value of the third indication information is a plurality of bits or is a plurality of bits obtained after binary conversion, the plurality of bits are sorted in descending order of LCIDs of the plurality of paths; or the plurality of bits are sorted in ascending order of LCIDs of the plurality of paths; or the plurality of bits are sorted in an order of configuring LCIDs of the plurality of paths; or the plurality of bits are sorted in an order of cell groups to which LCIDs of the plurality of paths belong, to be specific, sorting is performed in an order of a master cell group LCID first and then a secondary cell group LCID, and logical channel identifiers in each cell group are sorted in ascending order of LCIDs of a plurality of paths; or the plurality of bits are sorted in an order of cell groups to which LCIDs of the plurality of paths belong, to be specific, sorting is performed in an order of a secondary cell group LCID first and then a master cell group LCID, and logical channel identifiers in each cell group are sorted in ascending order of LCIDs of a plurality of paths; or the plurality of bits are sorted in an order of cell groups to which LCIDs of the plurality of paths belong, to be specific, sorting is performed in an order of a master cell group LCID first and then a secondary cell group LCID, and logical channel identifiers in each cell group are sorted in descending order of LCIDs of a plurality of paths; or the plurality of bits are sorted in an order of cell groups to which LCIDs of the plurality of paths belong, to be specific, sorting is performed in an order of a secondary cell group LCID first and then a master cell group LCID, and logical channel identifiers in each cell group are sorted in descending order of LCIDs of a plurality of paths; or the plurality of bits are sorted in descending order of LCIDs of the plurality of paths, and when LCIDs have a same value, sorting is performed in an order of a master cell group LCID first and then a secondary cell group LCID; or the plurality of bits are sorted in descending order of LCIDs of the plurality of paths, and when LCIDs have a same value, sorting is performed in an order of a secondary cell group LCID first and then a master cell group LCID; or the plurality of bits are sorted in ascending order of LCIDs of the plurality of paths, and when LCIDs have a same value, sorting is performed in an order of a master cell group LCID first and then a secondary cell group LCID; or the plurality of bits are sorted in ascending order of LCIDs of the plurality of paths, and when LCIDs have a same value, sorting is performed in an order of a secondary cell group LCID first and then a master cell group LCID.

Optionally, the first message includes fourth indication information, and a value of the fourth indication information is used to indicate the bearer configuration and the initial status of the bearer configuration.

Optionally, when the first message includes fifth indication information, it indicates that the bearer configuration is the second bearer configuration.

Alternatively, when the first message includes sixth indication information but does not include the fifth indication information, it indicates that the bearer configuration is the first bearer configuration, and an initial status of the first bearer configuration is an activated state.

Alternatively, when the first message includes neither the fifth indication information nor the sixth indication information, it indicates that the bearer configuration is the first bearer configuration, and an initial status of the first bearer configuration is a deactivated state.

Figure 21:
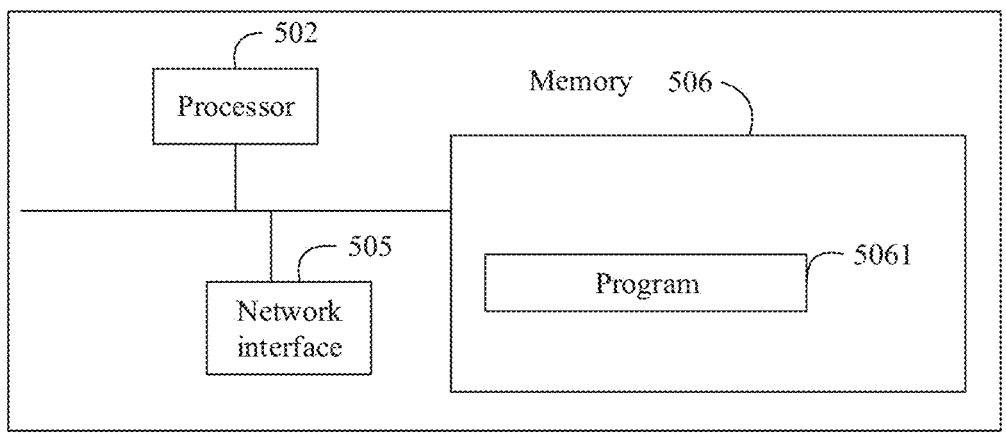
FIG. 21 is still another schematic block diagram of a communications device according to an embodiment of this application.

FIG. 21 is a schematic structural diagram of a communications device according to still another embodiment of this application. The communications device includes at least one processor 502 (for example, a CPU), at least one network interface 505 or another communications interface, and a memory 506. These components communicate with each other and are connected to each other. The processor 502 is configured to execute an executable module stored in the memory 506, for example, a computer program. The memory 506 may include a high-speed random access memory (RAM: Random Access Memory), or may include a nonvolatile memory (non-volatile memory), for example, at least one magnetic disk memory. A communication connection to at least one another network element is implemented through the at least one network interface 505 (which may be wired or wireless).

In some implementations, the memory 506 stores a program 5061, and the processor 502 executes the program 5061, to perform the methods in the foregoing embodiments of the present invention.

The processor 501 may be configured to perform a corresponding operation and/or function of the processing module 320 in the communications device 300, and the transceiver 503 may be configured to perform a corresponding operation and/or function of the transceiver module 310 in the communications device 300. For brevity, details are not described herein again.

Figure 22:
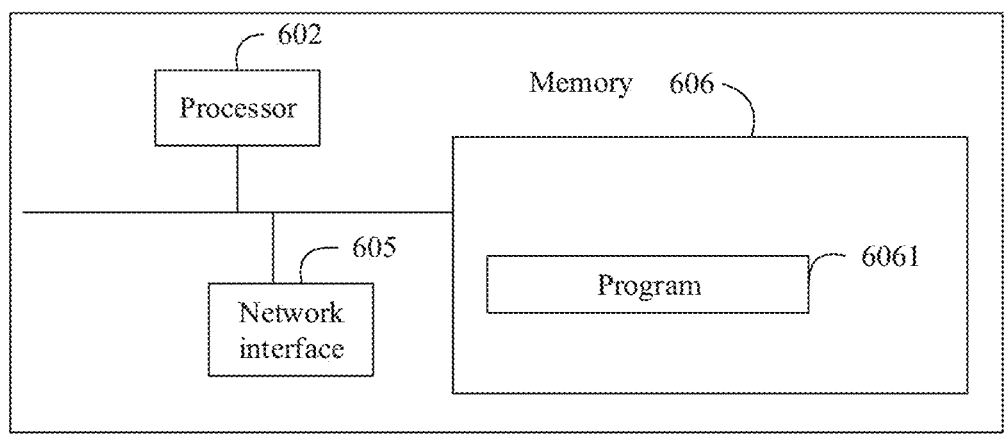
FIG. 22 is yet another schematic block diagram of a communications device according to an embodiment of this application.

FIG. 22 is a schematic structural diagram of a communications device according to yet another embodiment of this application. The communications device includes at least one processor 602 (for example, a CPU), at least one network interface 605 or another communications interface, and a memory 606. These components communicate with each other and are connected to each other. The processor 602 is configured to execute an executable module stored in the memory 606, for example, a computer program. The memory 606 may include a high-speed random access memory (RAM: Random Access Memory), or may include a nonvolatile memory (non-volatile memory), for example, at least one magnetic disk memory. A communication connection to at least one another network element is implemented through the at least one network interface 605 (which may be wired or wireless).

In some implementations, the memory 606 stores a program 6061, and the processor 602 executes the program 6061, to perform the methods in the foregoing embodiments of the present invention.

The processor 601 may be configured to perform a corresponding operation and/or function of the processing module 420 in the communications device 400, and the transceiver 603 may be configured to perform a corresponding operation and/or function of the transceiver module 410 in the communications device 400. For brevity, details are not described herein again.

An embodiment of this application further provides a chip system. The chip system is applied to a communications device. The chip system includes at least one processor, at least one memory, and an interface circuit. The interface circuit is responsible for information exchange between the chip system and the outside. The at least one memory, the interface circuit, and the at least one processor are connected to each other through a line. The at least one memory stores an instruction, and the instruction is executed by the at least one processor, to perform an operation performed by the communications device in the methods according to the foregoing aspects.

An embodiment of this application further provides a communications system. The communications system includes a communications device and/or a network device. The communications device is the communications device in the foregoing aspects.

An embodiment of this application further provides a computer program product. The computer program product is applied to a communications device. The computer program product includes a series of instructions, and the instructions are run, to perform an operation performed by the communications device in the methods according to the foregoing aspects.

In the embodiments of this application, it should be noted that the foregoing method embodiments in the embodiments of this application may be applied to a processor, or may be implemented by a processor. The processor may be an integrated circuit chip and has a signal processing capability. In an implementation process, steps in the foregoing method embodiments can be implemented by using a hardware integrated logic circuit in the processor, or by using instructions in a form of software. The processor may be a general-purpose processor, a digital signal processor (Digital Signal Processor, DSP), an application-specific integrated circuit (Application Specific Integrated Circuit, ASIC), a field programmable gate array (Field Programmable Gate Array, FPGA) or another programmable logic device, a discrete gate or transistor logic device, or a discrete hardware component. The processor may implement or perform the methods, the steps, and the logical block diagrams that are disclosed in the embodiments of this application. The general-purpose processor may be a microprocessor, or the processor may be any conventional processor or the like. Steps of the methods disclosed with reference to the embodiments of this application may be directly executed and completed by using a hardware decoding processor, or may be executed and completed by using a combination of hardware and software modules in the decoding processor. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

It can be understood that the memory in the embodiments of this application may be a volatile memory or a nonvolatile memory, or may include both a volatile memory and a nonvolatile memory. The nonvolatile memory may be a read-only memory (Read-Only Memory, ROM), a programmable read-only memory (Programmable ROM, PROM), an erasable programmable read-only memory (Erasable PROM, EPROM), an electrically erasable programmable read-only memory (Electrically EPROM, EEPROM), or a flash memory. The volatile memory may be a random access memory (Random Access Memory, RAM) that is used as an external cache. By way of example and not limitation, many forms of RAMs may be used, for example, a static random access memory (Static RAM, SRAM), a dynamic random access memory (Dynamic RAM, DRAM), a synchronous dynamic random access memory (Synchronous DRAM, SDRAM), a double data rate synchronous dynamic random access memory (Double Data Rate SDRAM, DDR SDRAM), an enhanced synchronous dynamic random access memory (Enhanced SDRAM, ESDRAM), a synchlink dynamic random access memory (Synchlink DRAM, SLDRAM), and a direct rambus random access memory (Direct Rambus RAM, DR RAM). It should be noted that the memory in the systems and methods described in this specification is intended to include but is not limited to these memories and another proper type of memories.

It should be understood that "one embodiment" or "an embodiment" mentioned in this specification means that particular features, structures, or characteristics related to the embodiment are included in at least one embodiment of this application. Therefore, "in one embodiment" or "in an embodiment" in this specification does not necessarily mean a same embodiment. In addition, these particular features, structures, or characteristics may be combined in one or more embodiments in any appropriate manner. It should be understood that sequence numbers of the foregoing processes do not mean execution sequences in the embodiments of this application. The execution sequences of the processes need to be determined based on functions and internal logic of the processes, and should not be construed as any limitation on the implementation processes of the embodiments of this application.

In addition, the terms "system" and "network" in this specification may be often used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification usually indicates an "or" relationship between the associated objects.

It should be understood that in the embodiments of this application, "B corresponding to A" indicates that B is associated with A, and that B may be determined based on A. However, it should be further understood that determining B based on A does not mean that B is determined based on only A, but means that B may be determined based on A and/or other information.

All or some of the foregoing embodiments may be implemented by using software, hardware, firmware, or any combination thereof. When the software is used to implement the embodiments, all or some of the embodiments may be implemented in a form of a computer program product. The computer program product may include one or more computer instructions. When the computer program instructions are loaded and executed on a computer, the procedures or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (such as a coaxial cable, an optical fiber, or a digital subscriber line (DSL)) or wireless (such as infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic disk), an optical medium (for example, a DVD), a semiconductor medium (for example, a solid-state drive Solid State Disk (SSD)), or the like.

A person of ordinary skill in the art may be aware that, in combination with the examples described in the embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It can be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatuses, and methods may be implemented in another manner. For example, the described apparatus embodiments are merely examples. For example, the unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
   receiving, by a first device, a first message sent by a second device, wherein the first message indicates a bearer configuration of a bearer of the first device and an initial status of the bearer configuration, and the bearer configuration comprises a first bearer configuration or a second bearer configuration, and wherein when the first message comprises first indication information, the first message indicates that the bearer configuration is the first bearer configuration and a value of the first indication information indicates an initial status of the first bearer configuration; and
   determining, by the first device, the bearer configuration and the initial status of the bearer configuration based on the first message.

2. The communication method according to claim 1, wherein the initial status of the first bearer configuration comprises an activated state or a deactivated state.

3. The communication method according to claim 1, wherein the bearer of the first device comprises N paths comprising a primary path, and the initial status of the first bearer configuration comprises initial statuses of N−1 paths in the N paths other than the primary path, wherein an initial status of each of the N−1 paths comprises an activated state or a deactivated state of a corresponding path, and wherein N is a positive integer greater than 1.

4. The communication method according to claim 3, wherein the value of the first indication information is a plurality of bits corresponding to the N−1 paths respectively, the plurality of bits in an ascending order of logical channel ID (LCID) of the N−1 paths in an order of a master cell group (MCG) and a secondary cell group (SCG).

5. The communication method according to claim 1, wherein the first bearer configuration indicates to configure the bearer as a bearer with duplication; or the second bearer configuration indicates to configure the bearer as a split bearer.

6. The communication method according to claim 1, wherein when the first message does not comprise the first indication information, the first message indicates that the bearer configuration is the second bearer configuration.

7. A communication method, comprising:

configuring, by a second device, a bearer configuration of a bearer of a first device and an initial status of the bearer configuration; and sending, by the second device, a first message to the first device, wherein the first message indicates the bearer configuration and the initial status of the bearer configuration, and the bearer configuration comprises a first bearer configuration or a second bearer configuration, and wherein when the first message comprises first indication information, the first message indicates that the bearer configuration is the first bearer configuration and a value of the first indication information indicates an initial status of the first bearer configuration.

8. The communication method according to claim 7, wherein the bearer of the first device comprises N paths comprising a primary path, and the initial status of the first bearer configuration comprises initial statuses of N−1 paths in the N paths other than the primary path, wherein an initial status of each of the N−1 paths comprise an activated state or a deactivated state of a corresponding path, and wherein N is a positive integer greater than 1.

9. The communication method according to claim 8, wherein the value of the first indication information is a plurality of bits corresponding to the N−1 paths respectively, the plurality of bits in an ascending order of logical channel ID (LCID) of the N−1 paths in an order of a master cell group (MCG) and a secondary cell group (SCG).

10. The communication method according to claim 7, wherein the initial status of the first bearer configuration comprises an activated state or a deactivated state.

11. The communication method according to claim 7, wherein the first bearer configuration indicates to configure the bearer as a bearer with duplication; or the second bearer configuration indicates to configure the bearer as a split bearer.

12. A communications device comprising:

a communications interface, configured to receive a first message sent by a second device, wherein the first message indicates a bearer configuration of a bearer of the communications device and an initial status of the bearer configuration, and the bearer configuration comprises a first bearer configuration or a second bearer configuration, wherein when the first message comprises first indication information, the first message indicates that the bearer configuration is the first bearer configuration and a value of the first indication information indicates an initial status of the first bearer configuration; and at least one processor, configured to determine, the bearer configuration and the initial status of the bearer configuration based on the first message.

13. The communications device according to claim 12, wherein the initial status of the first bearer configuration comprises an activated state or a deactivated state.

14. The communications device according to claim 12, wherein the bearer of the communications device comprises N paths comprising a primary path, the initial status of the first bearer configuration comprises initial statuses of N−1 paths in the N paths other than the primary path, wherein an initial status of each of the N−1 paths comprises an activated state or a deactivated state, and wherein N is a positive integer greater than 1.

15. The communications device according to claim 14, wherein the value of the first indication information is a plurality of bits corresponding to the N−1 paths respectively, the plurality of bits in an ascending order of logical channel ID (LCID) of the N−1 paths other than the primary path in an order of a master cell group (MCG) and a secondary cell group (SCG).

16. The communications device according to claim 12, wherein the first bearer configuration indicates to configure the bearer as a bearer with duplication; or the second bearer configuration indicates to configure the bearer as a split bearer.

17. The communications device according to claim 12, wherein when the first message does not comprise the first indication information, the first message indicates that the bearer configuration is the second bearer configuration.

18. The communication method according to claim 1, wherein the initial status of the bearer configuration is a status based on which the first device configures whether a duplication transmission is in operation.

19. The communication device according to claim 12, wherein the initial status of the bearer configuration is a status based on which the first device configures whether a duplication transmission is in operation.

* * * * *